United States Patent
Heidari-Bateni et al.

(10) Patent No.: US 7,710,321 B2
(45) Date of Patent: May 4, 2010

(54) RANGING SIGNALS METHODS AND SYSTEMS

(75) Inventors: Ghobad Heidari-Bateni, San Diego, CA (US); Khawza Iftekhar-Uddin Ahmed, San Diego, CA (US)

(73) Assignee: Olympus Corporation, Hachioji, Tokyo (JP)

( * ) Notice: Subject to any disclaimer, the term of this patent is extended or adjusted under 35 U.S.C. 154(b) by 9 days.

(21) Appl. No.: 11/968,402

(22) Filed: Jan. 2, 2008

(65) Prior Publication Data
US 2008/0258973 A1   Oct. 23, 2008

Related U.S. Application Data

(62) Division of application No. 11/364,522, filed on Feb. 27, 2006, now Pat. No. 7,450,069.

(51) Int. Cl.
*G01S 3/02* (2006.01)
*H04L 1/00* (2006.01)

(52) U.S. Cl. ........................ 342/458; 370/252
(58) Field of Classification Search ............... 342/458; 370/252
See application file for complete search history.

(56) References Cited

U.S. PATENT DOCUMENTS

| | | | |
|---|---|---|---|
| 5,959,568 A | 9/1999 | Woolley | |
| 6,002,708 A | 12/1999 | Fleming et al. | |
| 6,087,973 A | 7/2000 | Rowe | |
| 6,137,749 A | 10/2000 | Sumner | |
| 6,587,526 B1 | 7/2003 | Li et al. | |
| 6,697,768 B2 | 2/2004 | Jones et al. | |
| 6,731,908 B2 * | 5/2004 | Berliner et al. | 455/67.11 |
| 6,914,560 B2 | 7/2005 | Spilker et al. | |
| 7,135,903 B2 | 11/2006 | Kizer et al. | |
| 7,286,624 B2 | 10/2007 | Woo et al. | |
| 2002/0155845 A1 | 10/2002 | Martorana | |
| 2002/0169585 A1 | 11/2002 | Jones et al. | |
| 2003/0232620 A1 | 12/2003 | Runkle | |

(Continued)

OTHER PUBLICATIONS

Aiello et al., "Time to Market Pervasiveness—Multiband OFDM Products, " MBOA Multiband OFDM Alliance SIG, Sep. 13, 2004. available at: http://www.wimedia.org/en/resources/mboa_archives.asp.

(Continued)

*Primary Examiner*—Khoi Tran
*Assistant Examiner*—Harry Liu
(74) *Attorney, Agent, or Firm*—Sheppard Mullin Richter & Hampton LLP

(57) ABSTRACT

A system and method for estimating the range between two devices performs two or more ranging estimates with subsequent estimates performed using a clock that is offset in phase with respect to a prior estimate. The subsequent estimate allows estimate uncertainties due to a finite clock resolution to be reduced and can yield a range estimate with a higher degree of confidence. In one embodiment, these additional ranging estimates are performed at n/N (for n=1, . . . N−1, with N>1 and a positive integer) clock-period offset introduced in the device. The clock-period offset can be implemented using a number of approaches, and the effect of clock drift in the devices due to relative clock-frequency offset can also be determined. To eliminate the bias due to clock-frequency offset, a system and method to estimate the clock-frequency offset is also presented.

40 Claims, 17 Drawing Sheets

U.S. PATENT DOCUMENTS

| | | | |
|---|---|---|---|
| 2004/0072582 A1 | 4/2004 | Aljadeff et al. | |
| 2004/0178947 A1 | 9/2004 | Richley | |
| 2004/0203904 A1* | 10/2004 | Gwon et al. | 455/456.1 |
| 2005/0058081 A1* | 3/2005 | Elliott | 370/252 |
| 2006/0083340 A1 | 4/2006 | Gezici et al. | |
| 2006/0170565 A1 | 8/2006 | Husak et al. | |
| 2007/0075900 A1 | 4/2007 | Johnson | |
| 2008/0170559 A1* | 7/2008 | Zumsteg | 370/350 |
| 2008/0186136 A1* | 8/2008 | Raphaeli et al. | 340/10.1 |

OTHER PUBLICATIONS

Aiello et al., Multiband OFDM Physical Layer Specification, Release 1.0, Apr. 27, 2005.

Barr, "TG3 WiMedia Presentation to PC," Project: IEEE 802.15 Working Group for Wireless Personal Area Networks (WPANS), Nov. 11, 2002.

Batra et al., "Multiband OFDM Physical Layer Proposal for IEEE 802.15 Task Group 3a," MBOA-SIG Multiband OFDM Alliance SIG, Sep. 14, 2004.

Batra et al., "What is Really Fundamental?" MBOA Multiband OFDM Alliance SIG, Sep. 12, 2004, available at: http://www.wimedia.org/en/resources/mboa_archives.asp.

Filauro, "Radio Control Interface for Host Wire Adapter" (2004).

Foerster, "State of International UWB Regulation in ITU," MBOA Multiband OFDM Alliance SIG, Sep. 14, 2004, available at: http://www.wimedia.org/en/resources/mboa_archives.asp.

Froelich, "WiMedia Convergence Architecture" (2004).

Huang and Fidler, "Market Needs for a High Speed WPAN Specification," MBOA Multiband OFDM Alliance SIG, Sep. 14, 2004, available at: http://www.wimedia.org/en/resources/mboa_archives.asp.

Intel, "Ultra-Wideband (UWB) Technology: Enabling High-Speed Wireless Personal Area Networks," White Paper (2004).

Leeper et al., "Spectral Sculpting and a Future-Ready UWB, " MBOA Multiband OFDM Alliance SIG, Sep. 14, 2004, available at: http://www.wimedia.org/en/resources/mboa_archives.asp.

MBOA "Ultrawideband: High-speed, Short-range technology with Far-reaching Effects," MBOA-SIG White Paper, Sep. 14, 2004.

McCrady et al., "Mobile Ranging with Low Accuracy Cloaks," IEEE (1999) 85-88.

Patwari et al., IEEE Transactions on Signal Processing (2003) 51(8):2137-2148.

Ranta, "MB-OFDM for Mobile Handsets," MBOA Multiband OFDM Alliance SIG, Sep. 13, 2004, available at: http://www.wimedia.org/en/resources/mboa_archives.asp.

Razzell, "In-band Interference Properties of MB-OFDM," MBOA Multiband OFDM Alliance SIG, Sep. 14, 2004, available at: http://www.wimedia.org/en/resources/mboa_archives.asp.

Razzell et al., "CCA Algorithm Proposal for MB-OFDM," MBOA Multiband OFDM Alliance SIG, Sep. 14, 2004, available at: http://www.wimedia.org/en/resources/mboa_archives.asp.

Rosser, "Wireless Broadband" UWB Standards and Regulatory Update, Staccato Communications (2004).

Shoemake, "Multiband OFDM Update and Overview," MBOA Multiband OFDM Alliance SIG, Sep. 12, 2004.

Solomon et al., "Ultrawideband: A World Without Cables," CEA Webcast, Sep. 22, 2004, MBOA Multiband Alliance SIG, available at: http://www.wimedia.org/en/resources/mboa_archives.asp.

Steggles et al., "Local Positioning Systems" New Possibilities for Urban Combat Training, presented at IITSEC Dec. 2003.

Taylor and Fleming, "Relationship of WUSB and other WiMedia/MBOA Specifications," (2004).

Taylor, (ed.) Technical Specification: MBOA MAC-PHY Interface, May 27, 2004.

Zheng and Lee, IEEE Communications Magazine Jun. 2004 140-146.

\* cited by examiner

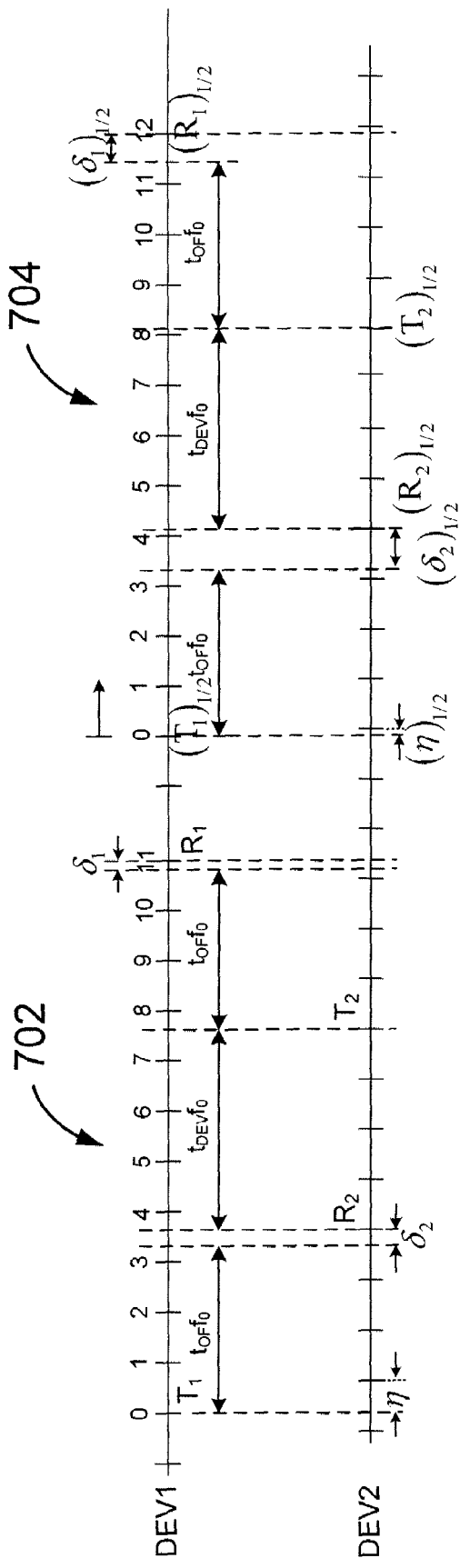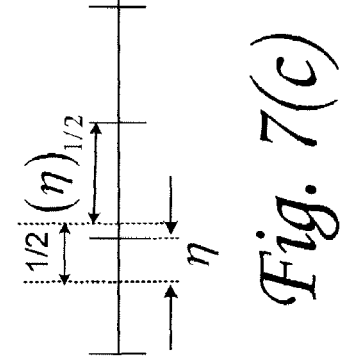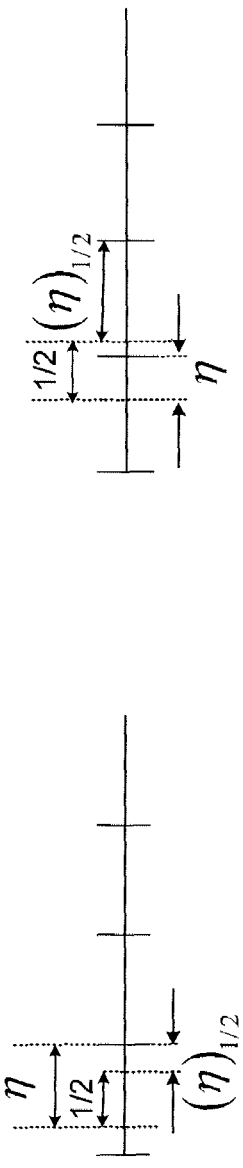
*Fig. 7(a)*
*Fig. 7(b)*
*Fig. 7(c)*

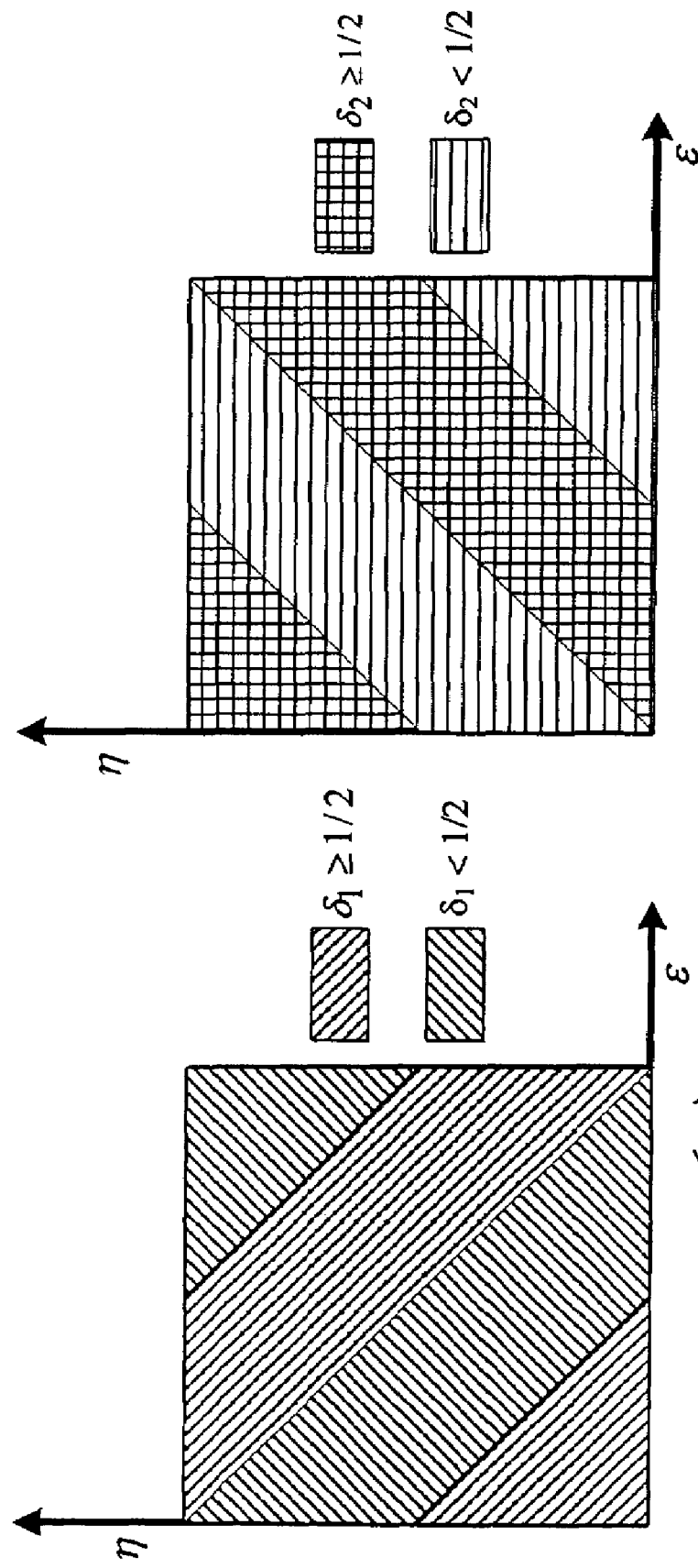

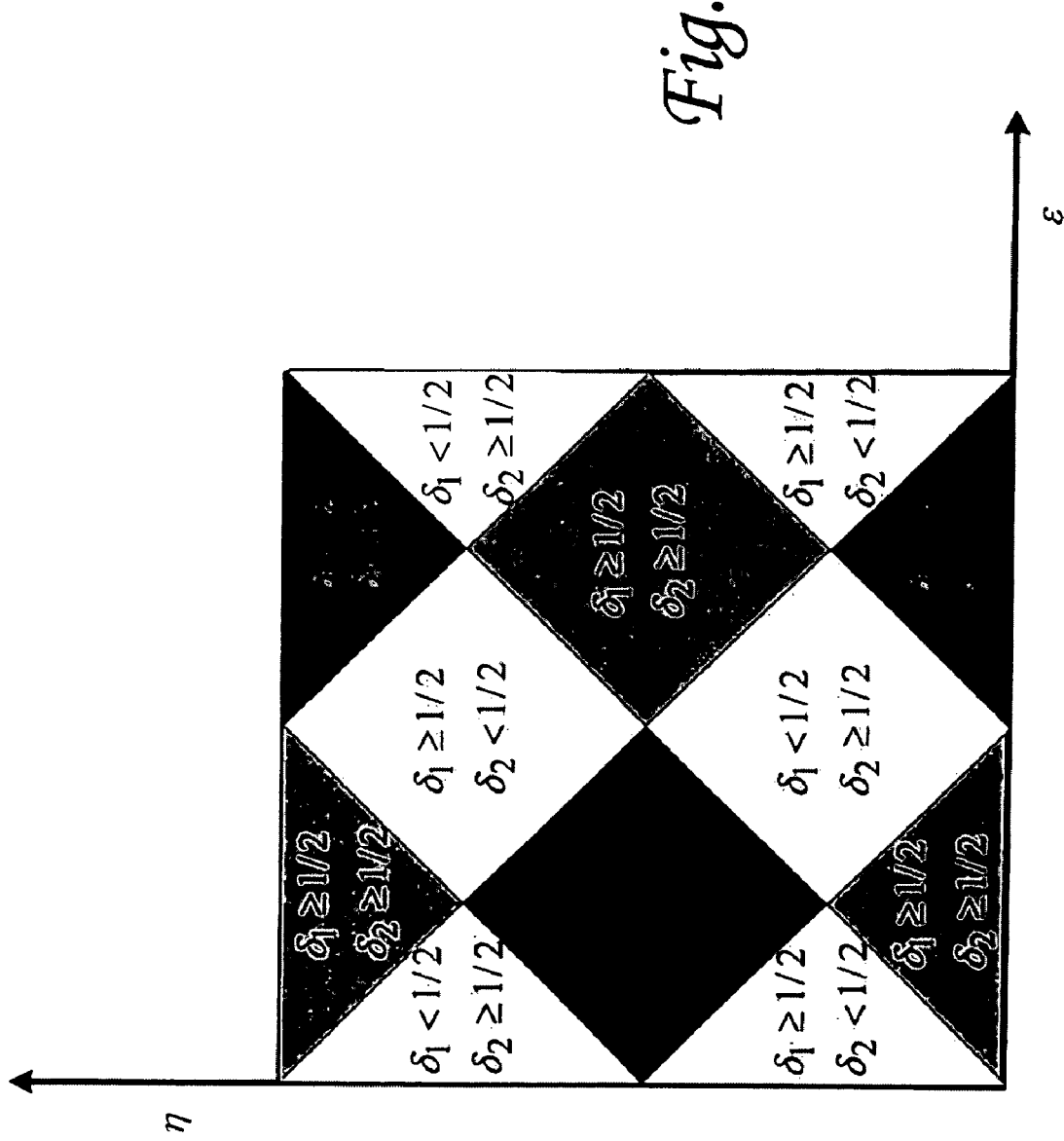

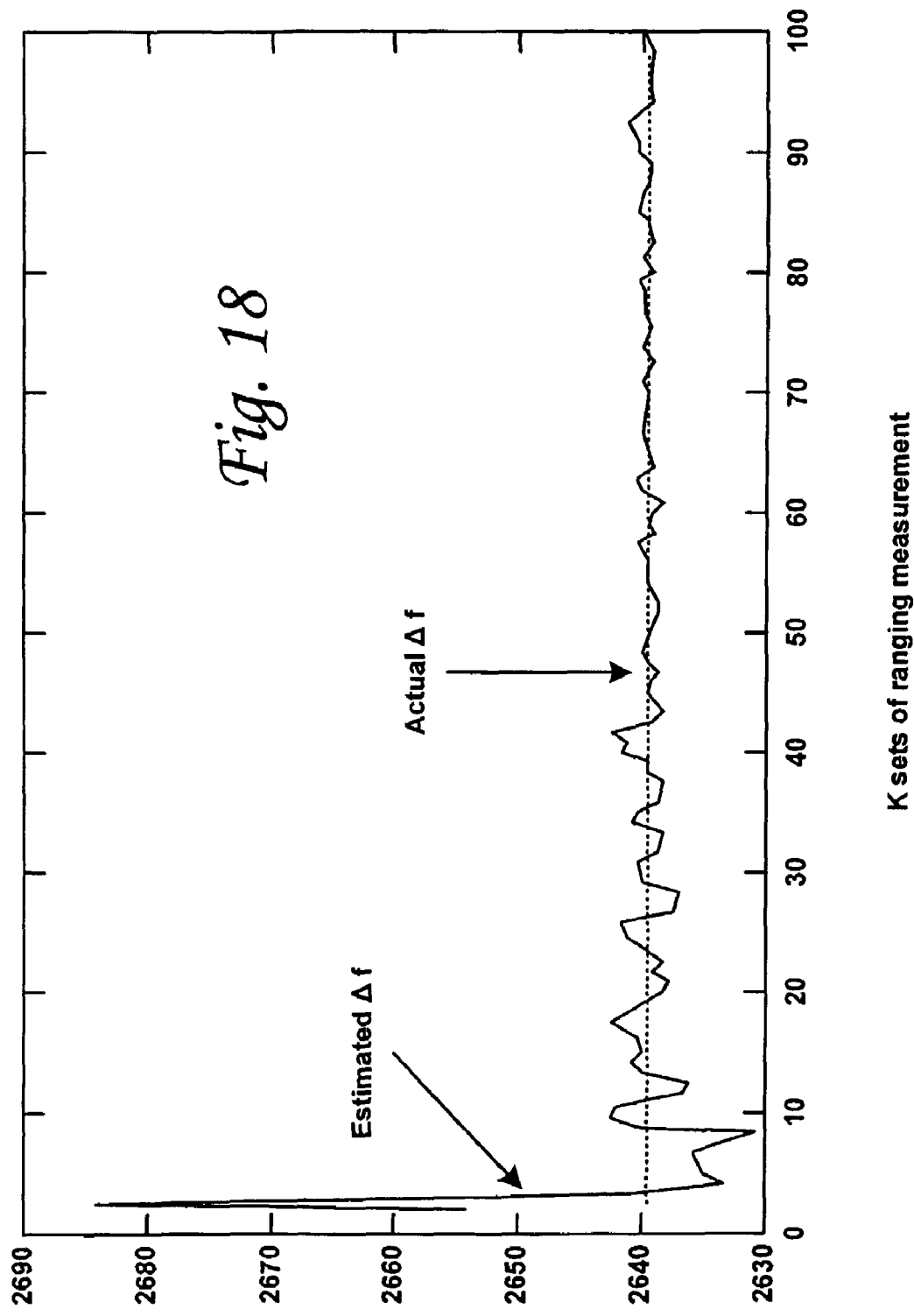

RANGING SIGNALS METHODS AND SYSTEMS

CROSS-REFERENCE TO RELATED APPLICATIONS

This application claims priority as a division of U.S. patent application Ser. No. 11/364,522, filed on Feb. 27, 2006 now U.S. Pat. No. 7,450,069, the entire contents of which are incorporated by reference.

FIELD OF THE INVENTION

The present invention relates generally to communication channels, and more particularly to a system and method for performing range calculations among two or more electronic devices.

BACKGROUND OF THE INVENTION

With the many continued advancements in communications technology, more and more devices are being introduced in both the consumer and commercial sectors with advanced communications capabilities. Additionally, advances in processing power and low-power consumption technologies, as well as advances in data coding techniques have led to the proliferation of wired and wireless communications capabilities on a more widespread basis.

For example, wired and wireless communication networks are now commonplace in many home and office environments. Such networks allow various heretofore independent devices to share data and other information to enhance productivity or simply to improve their convenience to the user. One such communication network that is gaining widespread popularity is an exemplary implementation of a wireless network such as that specified by the WiMedia-MBOA (Multiband OFDM Alliance). Other exemplary networks include the Bluetooth® communications network and various IEEE standards-based networks such as 802.11 and 802.16 communications networks.

Computing the distance of a target wireless device from a reference wireless device is called ranging. Ranging can be performed by measuring the received signal strength (RSS) or the time of arrival (time-of-arrival) of the signal propagated between the target and reference node. The ranging accuracy using the received signal strength depends on the accurate modeling of path-loss and the propagation channel environment. On the other hand, the ranging accuracy using time-of-arrival typically depends on the estimation accuracy of time of arrival, because electromagnetic waves propagate at approximately the speed of light and thus a small error (in the nanosecond scale) in time translates to larger error in distance. The estimation accuracy of time of arrival depends on the available signal bandwidth, and the accuracy and resolution of the sampling clock frequency. Therefore, ultra wideband (UWB) technology that occupies greater than 500 MHz bandwidth is suitable for ranging and provides centimeter-level accuracy. The proposed effort for IEEE 802.15.3a and WiMedia standardizes UWB technology to provide high-rate (>53.3 MB/s) wireless connectivity in wireless personal network (WPAN) and WiMedia has proposed two-way ranging (TWR) as an additional feature for UWB systems. Also, the specifications of IEEE 802.15.4a for low-rate (<250 KB/s) WPAN makes ranging mandatory.

Ranging using multiple reference devices can enable positioning. Computing the 2D/3D position of a target wireless device relative to a coordinate system commonly known to a set of reference devices is called positioning. One common positioning system is the Global Positioning System, or GPS. Geodesic positioning obtained by a GPS receiver requires synchronous signal from at least four satellites. Although, the coverage of GPS positioning is broad, it requires line-of-sight connectivity from the satellites that may not exist in certain geographic locations. Indoor coverage may suffer as well, such as in office building, shopping mall, warehouse, auditorium, indoor stadium, parking structure. Furthermore, GPS receivers are costly and provide only meter-level accuracy.

Another ranging technique is the local positioning systems (LPS). Local positioning systems can provide indoor positioning using an ad-hoc wireless sensor network. To provide different emerging applications of location awareness, the location of such sensors has to be accurate and automatically configurable. A host of applications can be envisioned using the LPS. For example: (i) LPS for public safety—placing a localizer along a trail to mark the route, locating fire fighters in a burning building, locating children lost in the mall or park, etc.; (ii) LPS for smart home applications—automatic door opening when the resident is in the vicinity, activating certain appliances or devices depending on resident location, timing adjustment of light, temperature and sound level per individual profile, finding personal item such as pets, keys, purse, luggage; (iii) LPS in inventory control—localizers for real-time inventory, differentiating the contents of one container from the others; locating a book in the library, a document file in a law office; (iv) LPS for health care—hospital staff, patients and assets tracking, simplified record keeping and workflow, raising an alert if a staff member had not check a particular patient, visitor tracking for security, automatic pop-up of patient record on a tablet PC for a doctor's visit; and (iv) LPS for intelligent vehicle highway system—placing localizers along the side of a road to use as guide posts, placing localizers in vehicles to provide local intelligence for safety and providing centimeter level accuracy as opposed to meter level accuracy using GPS. Thus, ubiquitous use of position awareness implies local positioning systems which are expected to be low-cost, low-power, small-size and have scaleable accuracy.

Two-way ranging between a pair of devices has been used in various applications, including wireless networks. In general, ranging accuracy of the time-of-flight-based method depends on the signal bandwidth used in the transactions. However, assuming an operating bandwidth of the receiver to be higher than the signal bandwidth, the rate of the sampling clock affects the timing accuracy of ranging transactions—the higher the rate of the sampling clock, the higher the ranging accuracy. This is due to the fact that sampling with a higher clock frequency results in a more accurate timing resolution. However, due to the difficulty of accurately synchronizing all devices in certain applications, two-way ranging accuracies can be somewhat diminished. For example, if the respective clocks of the devices participating in the measurement have relative offset between them, a certain amount of error will be introduced in the measurement.

One way to improve the accuracy is to increase the frequency of the clock. At higher frequencies, the clock periods are shorter and thus the maximum offset is smaller. The higher clock frequency also makes time resolutions finer, reducing uncertainties related to time quantization noise. For example, using 528 MHz sampling clock rate gives the finite ranging resolution of 56.8 cm. Typically, the overall offset is statistically smaller as well. However, it is not always possible, practical or desirable to increase the rate of the sampling clock. Higher clock frequency requires higher complexity and higher power consumption in the device.

BRIEF SUMMARY OF THE INVENTION

The present invention is directed toward a system and method for determining or estimating the distance between two devices based on the elapsed time required for a signal to travel between those devices. More particularly, in one embodiment, the present invention provides a measurement or other estimate of distance between two wireless devices based on the time of flight of a signal from one device to the next. The time of flight can be measured on a round trip basis, and divided in half to determine the one-way time of flight. In one embodiment, subsequent measurements are made to enhance the accuracy of the estimate. The subsequent measurements can be made with a phase offset introduced in a sampling clock so as to better account for uncertainties in the measurement process due to clock granularity.

In one embodiment the invention provides a system and method of determining a distance between first and second wireless communication devices, by conducting a first estimate of a time of flight of a signal between the first and second wireless communication devices, conducting at least one subsequent estimate of a time of flight of a signal between the first and second wireless communication devices, wherein the subsequent estimates are performed with a clock phase in the first device that is offset relative to a prior estimate, and computing a refined estimate of the time of flight of a signal between the first and second wireless communication devices as a function of the time-of-flight estimates. In one embodiment, the refined estimate can be computed by determining the difference between the first time-of-flight estimate and a second time-of-flight estimate and computing a refined estimate of the time of flight of the signal based on the difference between the first and second time-of-flight measurements.

In accordance with one embodiment of the invention, the refined estimate can be computed by determining a difference between a subsequent time-of-flight estimate and a prior time-of-flight estimate, determining a mean value of the uncertainty due to finite clock resolution in time-of-flight estimates, and adjusting the first time of flight estimate by an amount of clock cycles, wherein the amount of clock cycles is determined based on the differences between subsequent and prior time-of-flight estimates. The difference between time-of-flight estimates determined for each subsequent estimate can be determined as a difference between that subsequent estimate and the first estimate.

In one embodiment computing the refined estimate can be accomplished by determining the difference between the first time-of-flight estimate and a second time-of-flight estimate in cycles, as $(\hat{t}_{OF} - (\hat{t}_{OF})_{1/2}) \cdot f_0$; where $\hat{t}_{OF}$ is the first time-of-flight measurement, $(\hat{t}_{OF})_{1/2}$ is the second time-of-flight measurement and $f_0$ is the clock frequency; and computing a refined estimate of the time of flight of the signal based on the difference between the first and second time-of-flight measurements as if $D_{1/2} = 2(\hat{t}_{OF} - (\hat{t}_{OF})_{1/2}) \cdot f_0 = 1 \Rightarrow \check{t}_{OF} = \hat{t}_{OF} - \frac{3}{4}$ if $D_{1/2} = 2(\hat{t}_{OF} - (\hat{t}_{OF})_{1/2}) \cdot f_0 = 0 \Rightarrow \check{t}_{OF} = \hat{t}_{OF} - \frac{1}{2}$ if $D_{1/2} = 2(\hat{t}_{OF} - (\hat{t}_{OF})_{1/2}) \cdot f_0 = -1 \Rightarrow \check{t}_{OF} = \hat{t}_{OF} - \frac{1}{4}.$ In another embodiment computing the refined estimate can be accomplished by determining the difference between the first time-of-flight estimate and a second time-of-flight estimate in cycles, as $(\hat{t}_{OF} - (\hat{t}_{OF})_{1/2}) \cdot f_0$; where $\hat{t}_{OF}$ is the first time-of-flight measurement, $(\hat{t}_{OF})_{1/2}$ is the second time-of-flight measurement and $f_0$ is the clock frequency; and computing a refined estimate of the time of flight of the signal based on the difference between the first and second time-of-flight measurements as if $D_{1/2} = 2(\hat{t}_{OF} - (\hat{t}_{OF})_{1/2}) \cdot f_0 = 1 \Rightarrow \check{t}_{OF} \cdot f_0 = \hat{t}_{OF} \cdot f_0 + c_1$ if $D_{1/2} = 2(\hat{t}_{OF} - (\hat{t}_{OF})_{1/2}) \cdot f_0 = 0 \Rightarrow \check{t}_{OF} \cdot f_0 = \hat{t}_{OF} \cdot f_0 + c_2$ if $D_{1/2} = 2(\hat{t}_{OF} - (\hat{t}_{OF})_{1/2}) \cdot f_0 = -1 \Rightarrow \check{t}_{OF} \cdot f_0 = \hat{t}_{OF} \cdot f_0 + c_3$ where $c_1$, $c_2$ and $c_3$ are constants.

In accordance with one embodiment of the invention, computing the refined estimate can be accomplished by determining the difference between the time-of-flight estimates in cycles, where $\hat{t}_{OF}$ is the first time-of-flight measurement, $f_0$ is the clock frequency, and $D_{n/N}$, $n=0, 1, \ldots, N-1$ is the difference between the zero-th ($n=0$) estimate with no additional offset and an n-th estimate with n/N offset; and computing a refined estimate of the time of flight of the signal based on the difference, wherein the refined estimate is determined as $$(\check{t}_{OF})_N \cdot f_0 = \hat{t}_{OF} \cdot f_0 - \left(\frac{1}{2N}\left(\sum_{n=0}^{N-1} D_{n/N}\right) + \frac{1}{2}\right).$$

In another embodiment, the refined estimate is determined as $$(\check{t}_{OF})_N \cdot f_0 = \beta \cdot \left[\hat{t}_{OF} \cdot f_0 - \alpha \cdot \left(\frac{1}{2N}\left(\sum_{n=0}^{N-1} D_{n/N}\right) + \frac{1}{2}\right) + c\right],$$

where $\alpha$, $\beta$ and c are constants.

Further features and advantages of the present invention, as well as the structure and operation of various embodiments of the present invention, are described in detail below with reference to the accompanying drawings.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 7(a) is a diagram illustrating an example of the ranging inaccuracy due to $\delta_1$ and $\delta_2$ and insertion of ½ clock period time-offset in device 102 clock in accordance with one embodiment of the invention.

FIG. 7(b) is a diagram illustrating an example of the relation between time-offset $\eta$ and $(\eta)_{1/2}$ with ½ clock-period offset) when ½<$\eta$<1.

FIG. 7(c) is a diagram illustrating an example of the relation between time-offset $\eta$ and $(\eta)_{1/2}$ with ½ clock-period offset) where 0<$\theta$<½.

FIG. 10(a) is a diagram illustrating a case where the ($\epsilon$, $\eta$) plane is separated with respect to $\delta_1 \geq ½$, $\delta_1 < ½$.

FIG. 10(b) is a diagram illustrating a case where the ($\epsilon$, $\eta$) plane is separated with respect to $\delta_2 \geq ½$, $\delta_2 < ½$.

FIG. 10(c), is a diagram illustrating a case where the ($\epsilon$, $\eta$) plane is separated as a joint function of $\delta_1$ and $\delta_2$ on the basis of $\delta_1<½,\delta_2<½$, $\delta_1<½,\delta_2\geq½$, $\delta_1\geq½,\delta_2<½$, and $\delta_1\geq½, \delta_2\geq½$.

for a given $\{D_{n/N}\}_{n=0}^{N-1}$.

Figure 13:
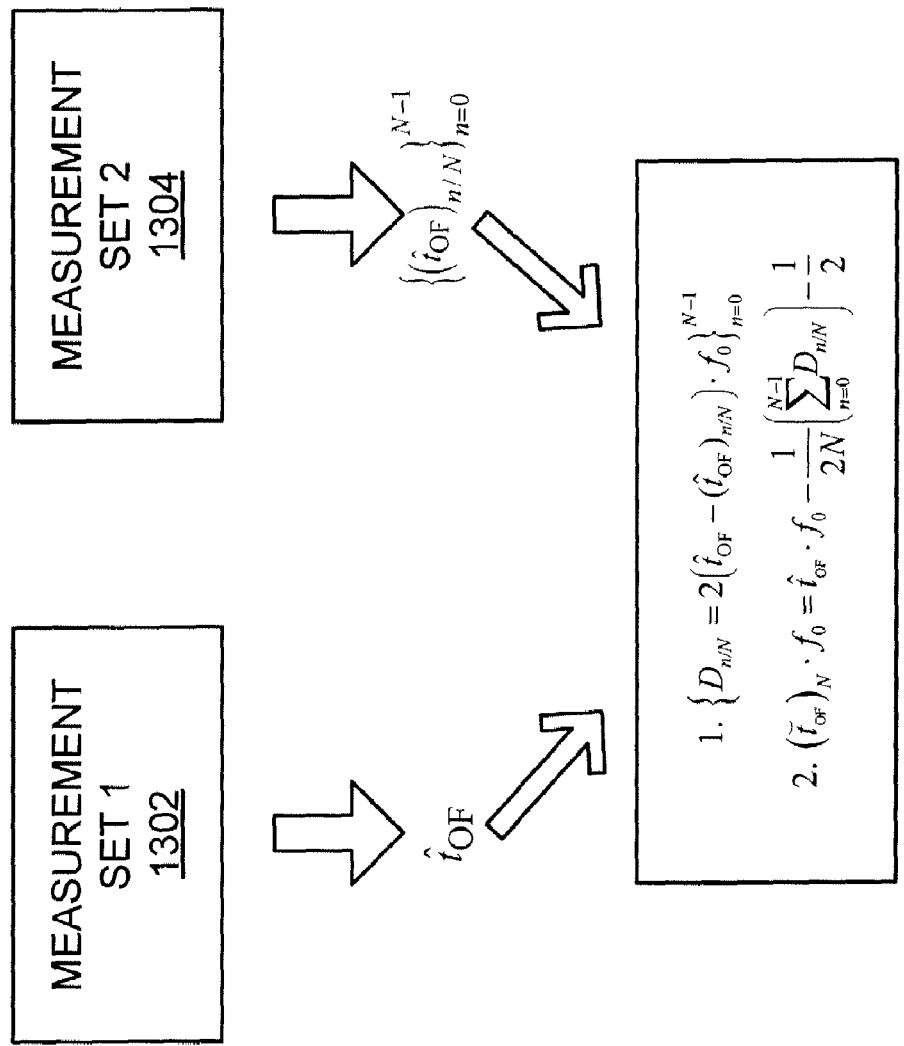

FIG. 13 is a diagram illustrating a high level view of multiple ranging measurements with n/N clock-period offset measurements in accordance with one embodiment of the invention.

Figure 14:
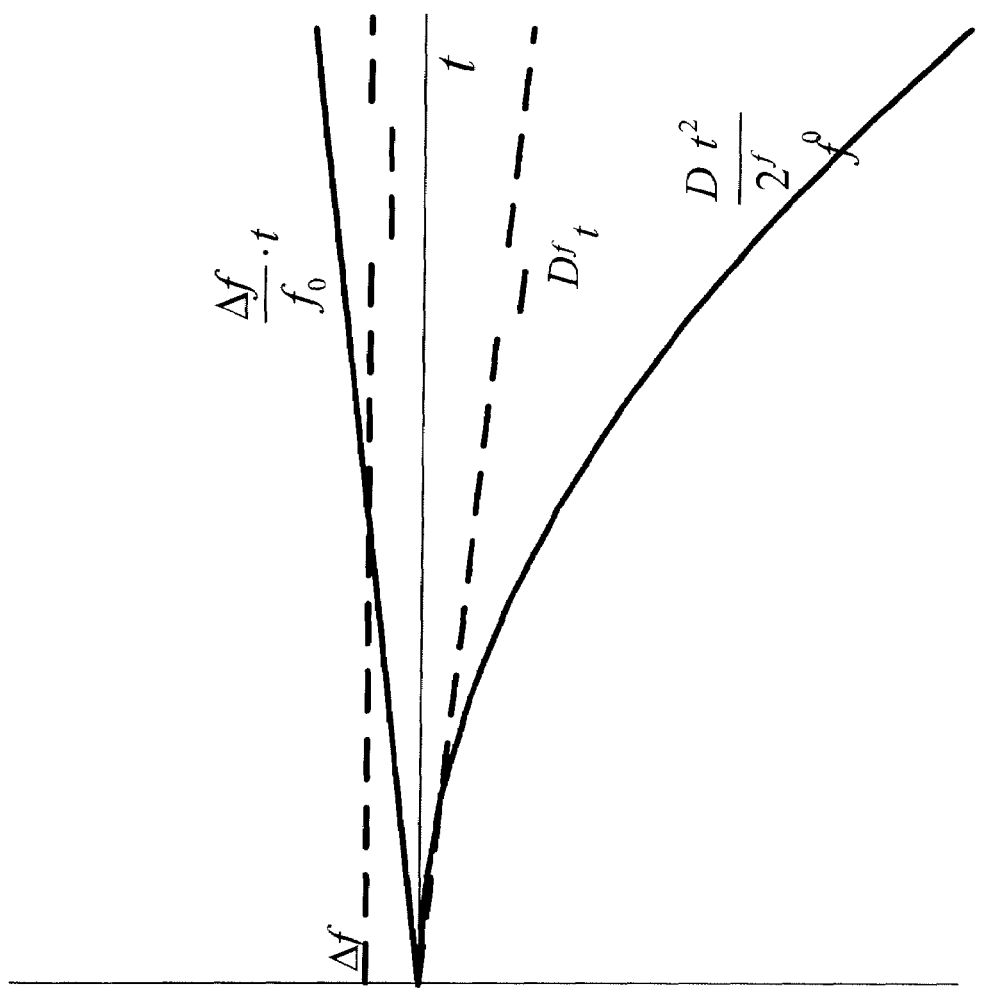

FIG. 14 is a diagram illustrating an example case of instantaneous frequency $f_i(t)$ and clock timing $t_i(t)$.

Figure 15:
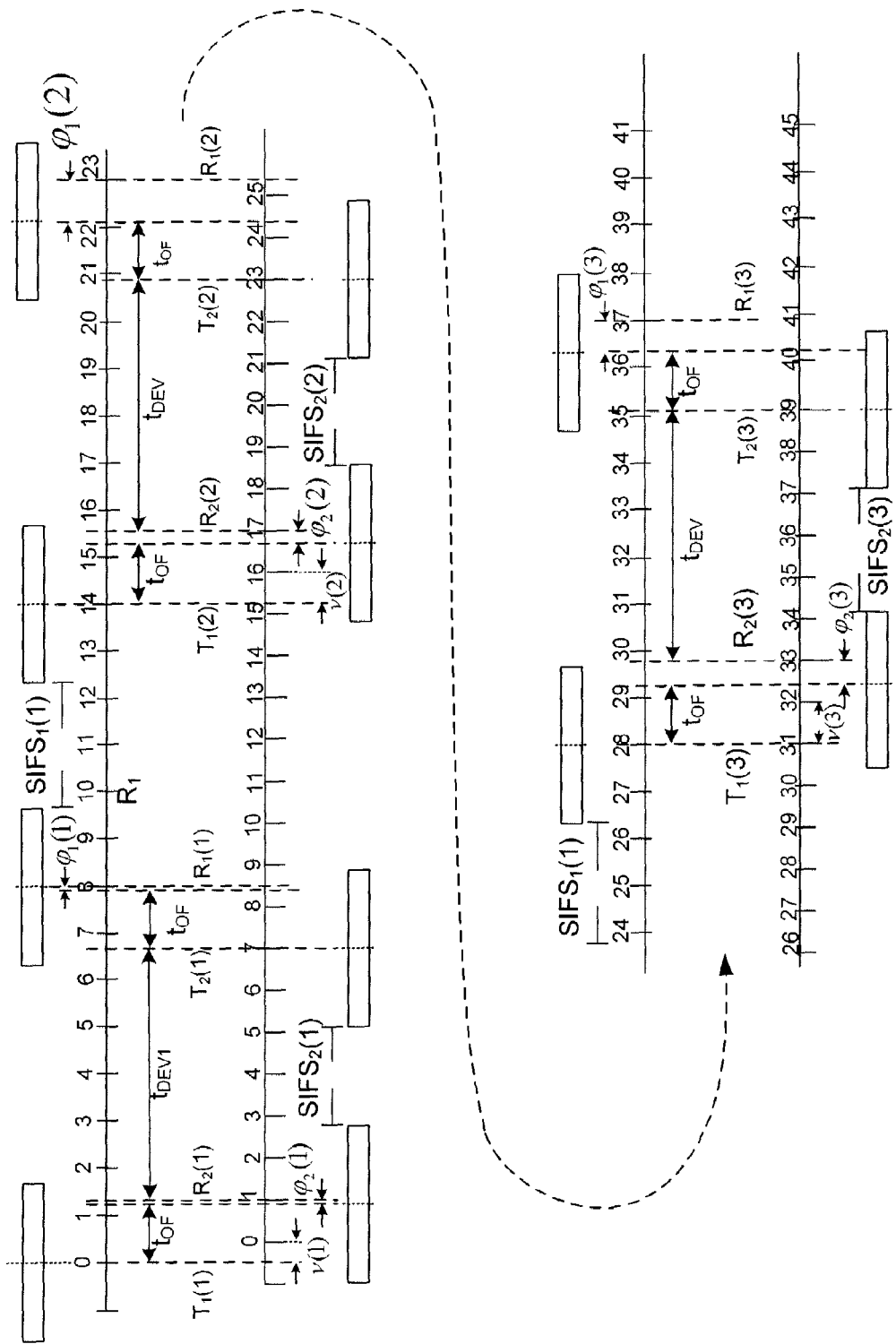

FIG. 15 is a diagram illustrating three sets of ranging measurements that can be used to estimate the clock-frequency offset in accordance with one embodiment of the invention.

Figure 16:
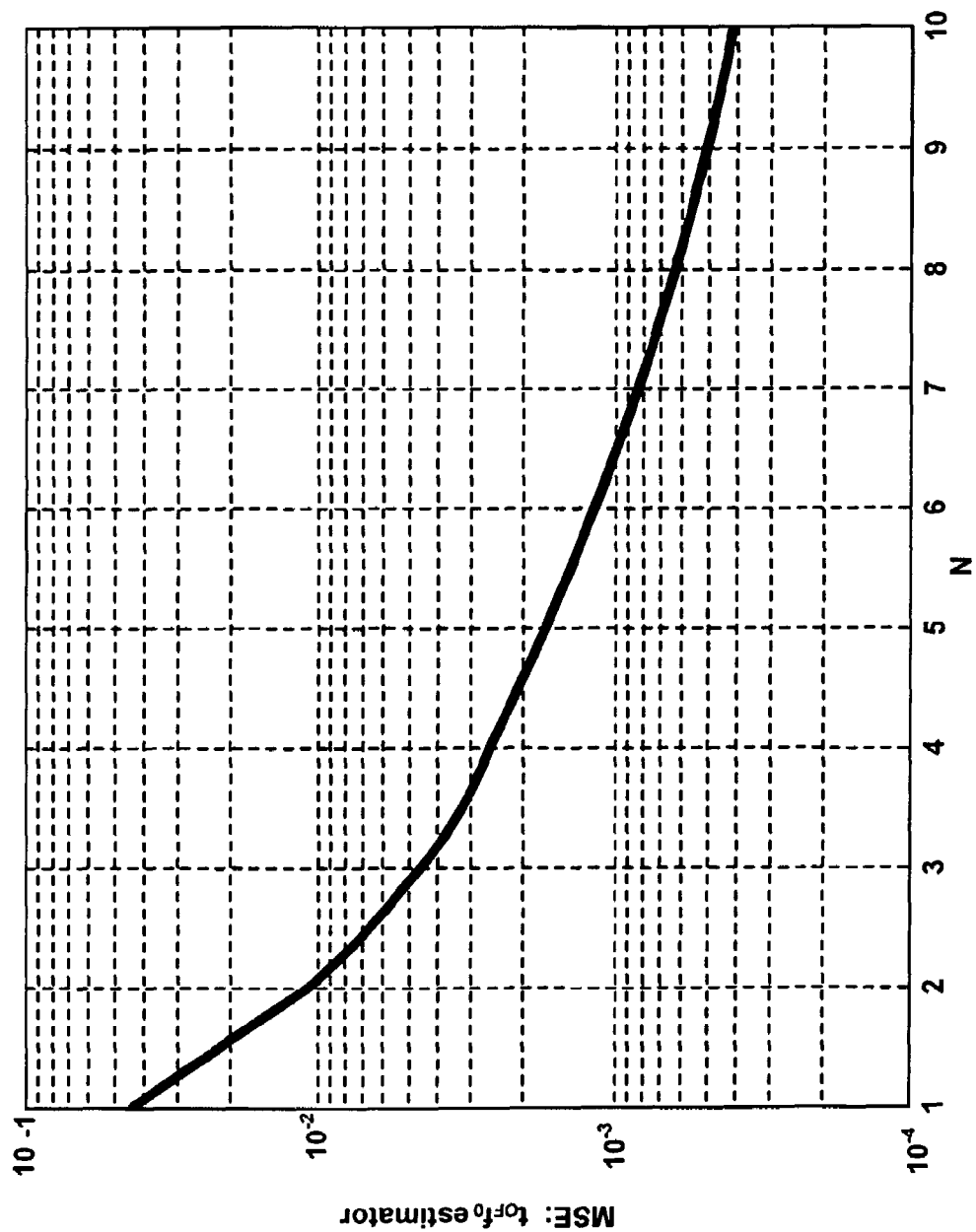

FIG. 16 illustrates a performance comparison of time of flight (in clock cycles) estimators using one embodiment of the present invention.

Figure 17:
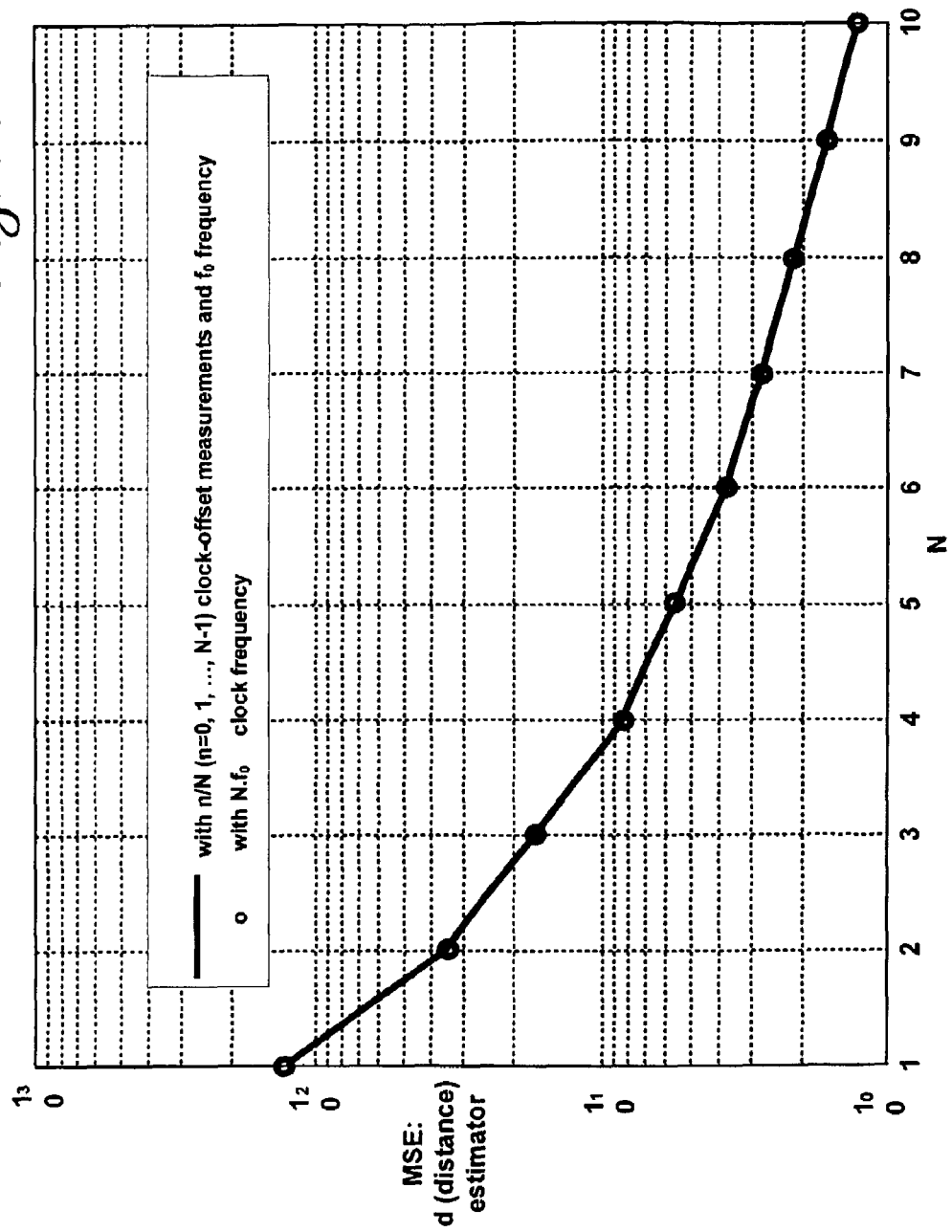

FIG. 17 is a diagram illustrating simulation results for a performance comparison of ranging from N=1 to 10, where N=1 is a conventional technique, and using N·$f_0$ sampling clock frequency.

FIG. 18 is a plot illustrating the improvement of the accuracy of clock-frequency offset over the number of ranging measurement sets K in accordance with one embodiment of the invention.

DESCRIPTION OF THE PREFERRED EMBODIMENTS

Before describing the invention in detail, it is useful to describe an example environment in which the invention can be implemented. Two-way ranging can be implemented in a number of environments and is particularly useful in wireless networks due to the difficulty of accurately synchronizing the network devices. Two-way time-of-arrival measurements can be used with asynchronous devices such as those in a wireless network. This can be accomplished by calculating the round-trip propagation delay at a single device and then dividing the result by two to yield an estimate of the one-way time of flight. The one way time of flight can be used with the propagation rate across the communication channel to determine the distance between the two devices. In this document, the terms "measurement" and "estimate" are used somewhat interchangeably. It shall be understood that the term "measurement" may, but does not necessarily, imply a certain degree precision. In fact a measurement generally has a certain degree of imprecision based on system constraints such as, for example, clock resolution, uncertainties in propagation delay, system latencies, and the like. The same can be said for the term "estimate," which may itself be a measurement or may be based on a measurement. As such, estimates may also have a certain degree of precision or imprecision, depending on the system, application or other circumstances.

One example environment in which the invention can be implemented is a wireless communication network in which multiple electronic devices (for example, computers and computing devices, cellular telephones, personal digital assistants, motion and still cameras, among others) can communicate and share data, content and other information with one another. One example of such a network is that specified by the MB-UWB standard (within WiMedia and Multi-Band OFDM Alliance). From time-to-time, the present invention is described herein in terms of a wireless network or in terms of the MB-UWB standard. Description in terms of these environments is provided to allow the various features and embodiments of the invention to be portrayed in the context of an exemplary application. After reading this description, it will become apparent to one of ordinary skill in the art how the invention can be implemented in different and alternative environments. Indeed, applicability of the invention is not limited to a wireless network, nor is it limited to the MB-UWB standard described as one implementation of the example environment.

Figure 1:
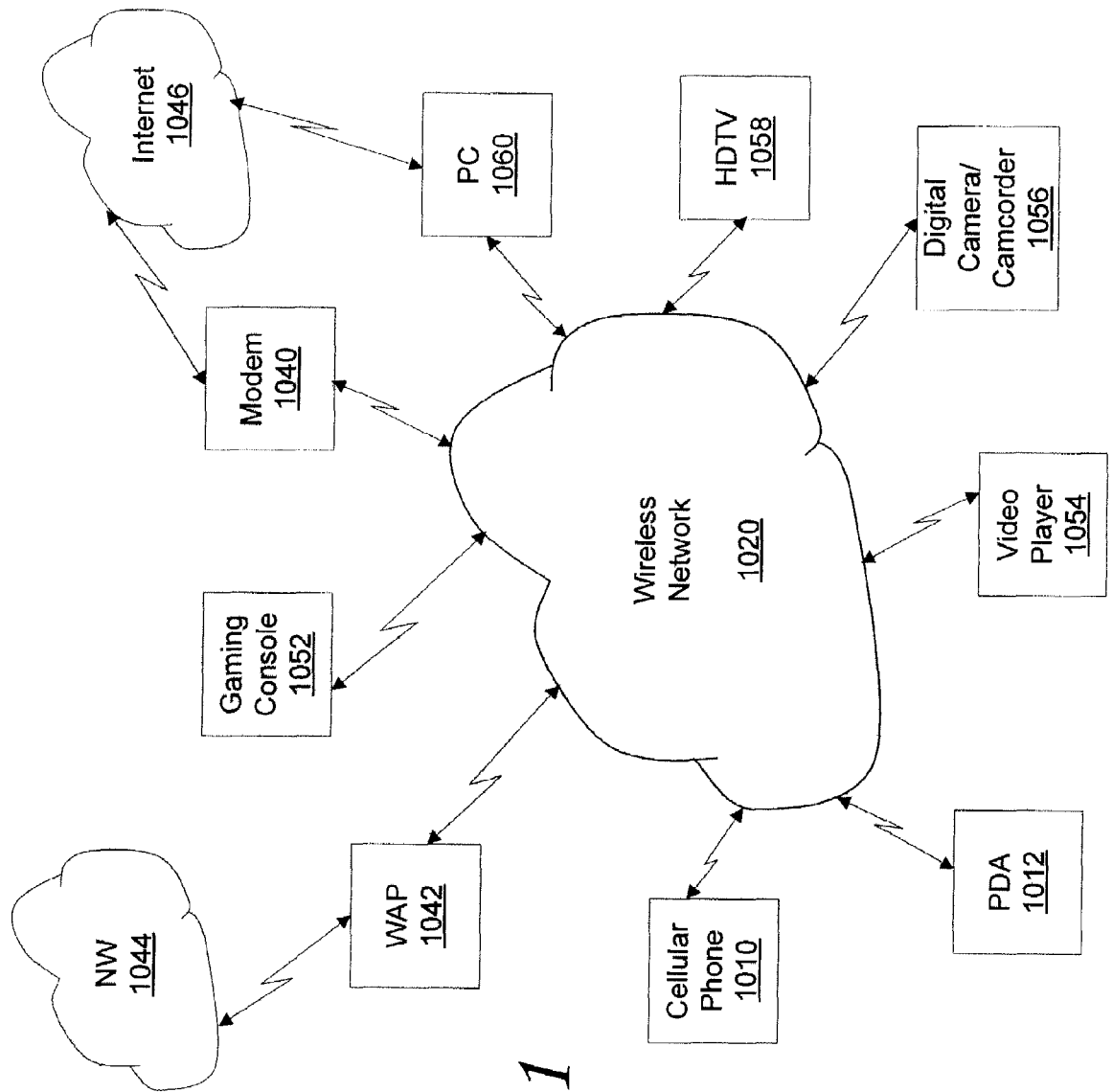
FIG. 1 is a block diagram illustrating one possible configuration of a wireless network that can serve as an example environment in which the present invention can be implemented.

FIG. 1 is a block diagram illustrating one possible configuration of a wireless network that can serve as an example environment in which the present invention can be implemented. Referring now to FIG. 1, a wireless network 1020 is provided to allow a plurality of electronic devices to communicate with one another without the need for wires or cables between the devices. A wireless network 1020 can vary in coverage area depending on a number of factors or parameters including, for example, the transmit power levels and receive sensitivities of the various electronic devices associated with the network. Examples of wireless networks can include the various IEEE and other standards as described above, as well as other wireless network implementations.

With many applications, the wireless network 1020 operates in a relatively confined area, such as, for example, a home or an office. The example illustrated in FIG. 1 is an example of an implementation such as that which may be found in a home or small office environment. Of course wireless communication networks and communication networks in general are found in many environments outside the home and office as well. In the example illustrated in FIG. 1, wireless network 1020 includes a communication device to allow it to communicate with external networks. More particularly, in the illustrated example, wireless network 1020 includes a modem 1040 to provide connectivity to an external network such as the Internet 1046, and a wireless access point 1042 that can provide external connectivity to another network 1044.

Also illustrated in the example wireless network 1020 are portable electronic devices such as a cellular telephone 1010 and a personal digital assistant (PDA) 1012. Like the other electronic devices illustrated in FIG. 1, cellular telephone 1010 and PDA 1012 can communicate with wireless network 1020 via the appropriate wireless interface. Additionally, these devices may be configured to further communicate with an external network. For example, cellular telephone 1010 is typically configured to communicate with a wide area wireless network by way of a base station.

Additionally, the example environment illustrated in FIG. 1 also includes examples of home entertainment devices connected to wireless network 1020. In the illustrated example, electronic devices such as a gaming console 1052, a video player 1054, a digital camera/camcorder 1056, and a high-definition television 1058 are illustrated as being interconnected via wireless network 1020. For example, a digital camera or camcorder 1056 can be utilized by a user to capture one or more still picture or motion video images. The captured images can be stored in a local memory or storage device associated with digital camera or camcorder 1056 and ultimately communicated to another electronic device via wireless network 1020. For example, the user may wish to provide a digital video stream to a high definition television set 1058 associated with wireless network 1020. As another example, the user may wish to upload one or more images from digital camera 1056 to his or her personal computer 1060 or to the Internet 1046. This can be accomplished by wireless network 1020. Of course, wireless network 1020 can be utilized to provide data, content, and other information sharing on a peer-to-peer or other basis, as the provided examples serve to illustrate.

Also illustrated is a personal computer 1060 or other computing device connected to wireless network 1020 via a wireless air interface. As depicted in the illustrated example, personal computer 1060 can also provide connectivity to an external network such as the Internet 1046.

In the illustrated example, wireless network 1020 is implemented so as to provide wireless connectivity to the various electronic devices associated therewith. Wireless network 1020 allows these devices to share data, content, and other information with one another across wireless network 1020. Typically, in such an environment, the electronic devices would have the appropriate transmitter, receiver, or transceiver to allow communication via the air interface with other devices associated with wireless network 1020. These electronic devices may conform to one or more appropriate wireless standards and, in fact, multiple standards may be in play within a given neighborhood. Electronic devices associated with the network typically also have control logic configured to manage communications across the network and to manage the operational functionality of the electronic device. Such control logic can be implemented using hardware, software, or a combination thereof. For example, one or more processors, ASICs, PLAs, and other logic devices or components can be included with the device to implement the desired features and functionality. Additionally, memory or other data and information storage capacity can be included to facilitate operation of the device and communication across the network.

Electronic devices operating as a part of wireless network 1020 are sometimes referred to herein as network devices, members or member devices of the network or devices associated with the network. In one embodiment devices that communicate with a given network may be members or they may merely be in communication with the network.

Having thus described an example environment in which the invention can be implemented, various features and embodiments of the invention are now described in further detail. Description may be provided in terms of this example environment for ease of discussion and understanding only. After reading the description herein, it will become apparent to one of ordinary skill in the art that the present invention can be implemented in any of a number of different communication environments (including wired or wireless communication environments, and distributed or non-distributed networks) operating with any of a number of different electronic devices.

Figure 2:
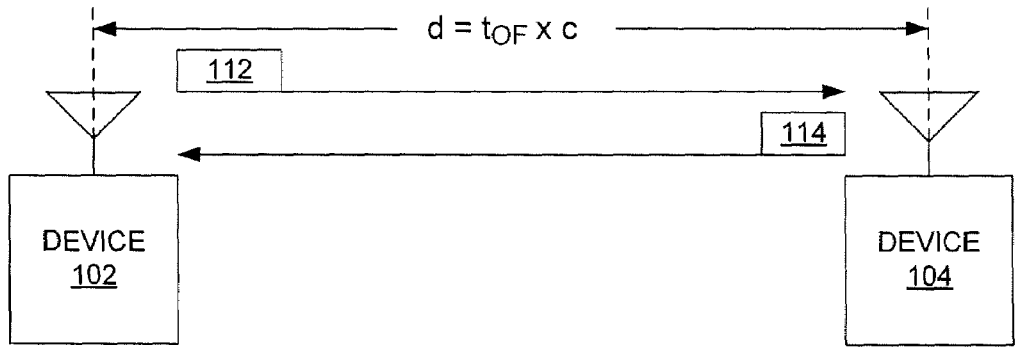
FIG. 2 is a diagram illustrating an example of time-of-flight measurement using two-way packet transmission in accordance with one embodiment of the invention.
Figure 3:
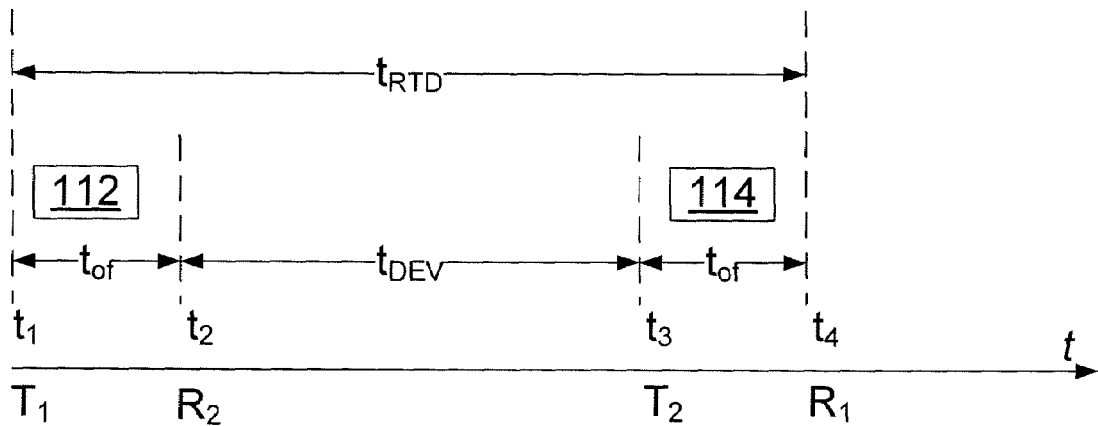
FIG. 3 is a diagram illustrating an example timeline for two-way ranging in accordance with one embodiment of the invention.
Figure 4:
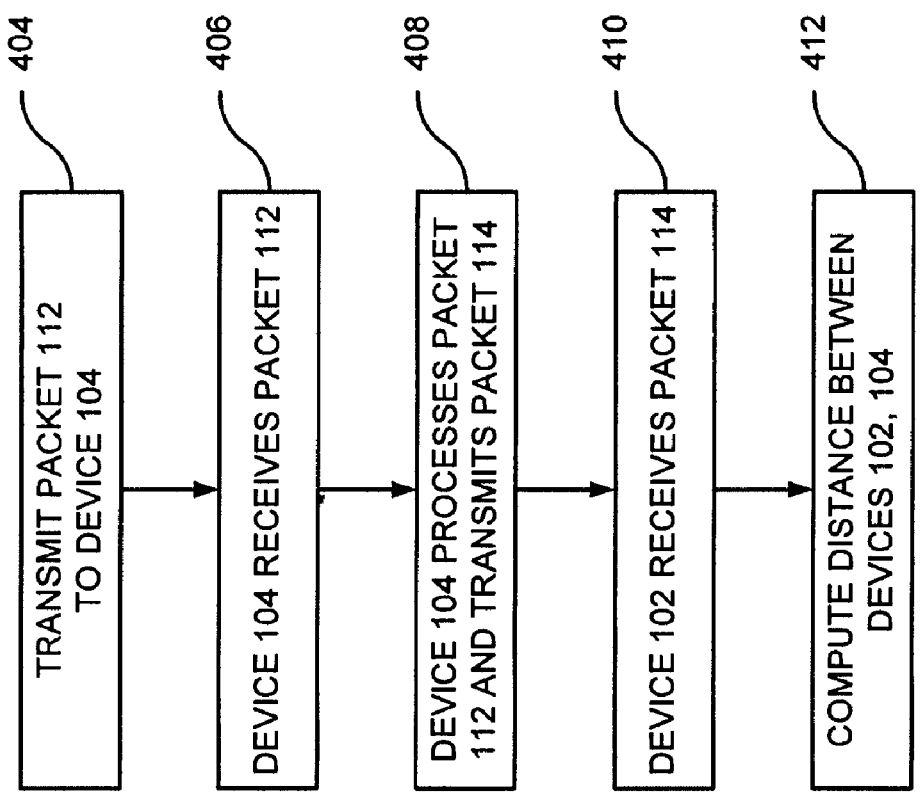
FIG. 4 is a flow diagram illustrating a process for two-way ranging in accordance with one embodiment of the invention.

Ranging between network devices can take place as one-way or two-way ranging. One-way ranging measures the time of flight of a signal or information, such as for example a packet or other transmission, from a first network device to a second network device. Two-way ranging estimates the distance d between two network devices by measuring the round-trip time between the two devices and estimating the distance between the devices based on the measurements obtained from the start and arrival time of the packets. FIG. 2 is a diagram illustrating an example configuration for two-way ranging. FIG. 3 is a diagram illustrating an example timeline for two-way ranging. FIG. 4 is an operational flow diagram illustrating steps conducted in this example two-way ranging process. Referring now to FIGS. 2, 3 and 4, in a step 404, network device 102 transmits a packet 112 to a second network device 104 at a time $t_1$. In a step 406, Packet 112 is received at device 104 at a time $t_2$. In a step 408, device 104 processes the packet and, after a brief delay, transmits a response packet, packet 114, to device 102 at a time $t_3$. Packets 112 and 114 can be the same packet with the same information, or additional or different information can be provided. In a step 410, at time $t_4$, device 102 receives packet 114. In a step 412, the distance is computed. In one embodiment, device 102 can now compute the distance to device 104 based on the simple formula: distance=rate*time. More particularly, given an estimate of time of flight $t_{OF}$ of packet 112, and if c is the speed of propagation of an electromagnetic wave, then the distance $d = t_{OF} * c$.

According to the convention adopted in FIG. 3, the absolute time when the reference (which is used to demark the start or arrival time) of packet 112 leaves device 102 is denoted $t_1$, and the recorded counter value in device 102 at time $t_1$ is $T_1$. In one embodiment, the counter of the device counts the pulses of the device clock, which can be synchronized with sampling rate. At time $t_2$ packet 112 reaches device 104 and the recorded counter value in device 104 at time $t_2$ is $R_2$. The processing time in device 104 is $t_{DEV}$ and the return packet 114 leaves device 104 at time $t_3$ when the counter value in device 104 is $T_2$. Thus, $t_{DEV} = t_3 - t_2$. Return packet 114 reaches device 102 at $t_4$ and the recorded counter value at time $t_4$ is $R_1$.

Therefore, given the above described conventions adopted in FIG. 3, the round trip delay is $t_{RTD} = t_4 - t_1$ and the time of flight $t_{OF}$ can be written as set forth in equation (1).

$$t_{OF} = \frac{t_{RTD} - t_{DEV}}{2} = \frac{(t_4 - t_1) - (t_3 - t_2)}{2} \qquad (1)$$

If all the timing instants are precisely recorded by the clock-counter value, the time of flight can be expressed in terms of the clock counter values as $$t_{OF} = \frac{(R_1 - T_1) - (T_2 - R_2)}{2f_0}, \quad (2)$$

where $f_0$ is the sampling frequency of the device clock of device 102 and device 104. Note that equation (2) represents the estimate of the time of flight in terms of counter values or the measurements made by the devices upon transmission and reception of packets. Therefore, the time of flight is ascertainable and does not need the time synchronization of the device clocks of device 102 and device 104 for this estimate.

Because the distance between two devices is given by $d = t_{OF} \cdot c$, and c for an electromagnetic wave in free space is very large (on the order of $3 \cdot 10^{10}$ cm/sec), a small error in the estimate of time of flight typically can create a large error in estimated distance. There are various sources of such small errors that could impact the difference between the actual time of flight and the estimated time of flight using equation (2). For example, the sampling instant of the device clock is discrete and therefore, there will be an error between the actual time of event and the time when a measurement is taken, or, recorded as a counter value. For example, due to a discrete sampling interval, t2 and R2 may not exactly coincide in time, resulting in an inaccuracy. Thus, some conventional solutions have increased the sampling rate to reduce sampling interval (i.e., increase time resolution) and hence improve the ranging accuracy.

In one embodiment of the present invention, additional ranging measurements are employed in time-of-arrival-based two-way ranging applications to provide improved accuracy without necessitating a higher sampling clock frequency. Particularly, in one embodiment, clock-offset measurements are utilized in a two-way ranging application that improves the ranging accuracy without increasing the sampling clock-rate. In some cases, it may be possible to reduce the confidence interval (while maintaining the same level of confidence) of the estimate of the time of flight (in clock-cycles) by a factor of N when clock-period offsets n/N, for $n=1, \ldots, N-1$, are used in the ranging measurements.

In accordance with one embodiment of the invention, the presence of relative clock drift (induced or otherwise) or offset measurement intervals between devices can be used in the measurement process to further refine the estimate. An analysis on the estimation of the clock-frequency offset in the presence of finite clock resolution can also be used in one embodiment to enable reduction or elimination of the bias due to clock-frequency offset.

Figure 5:
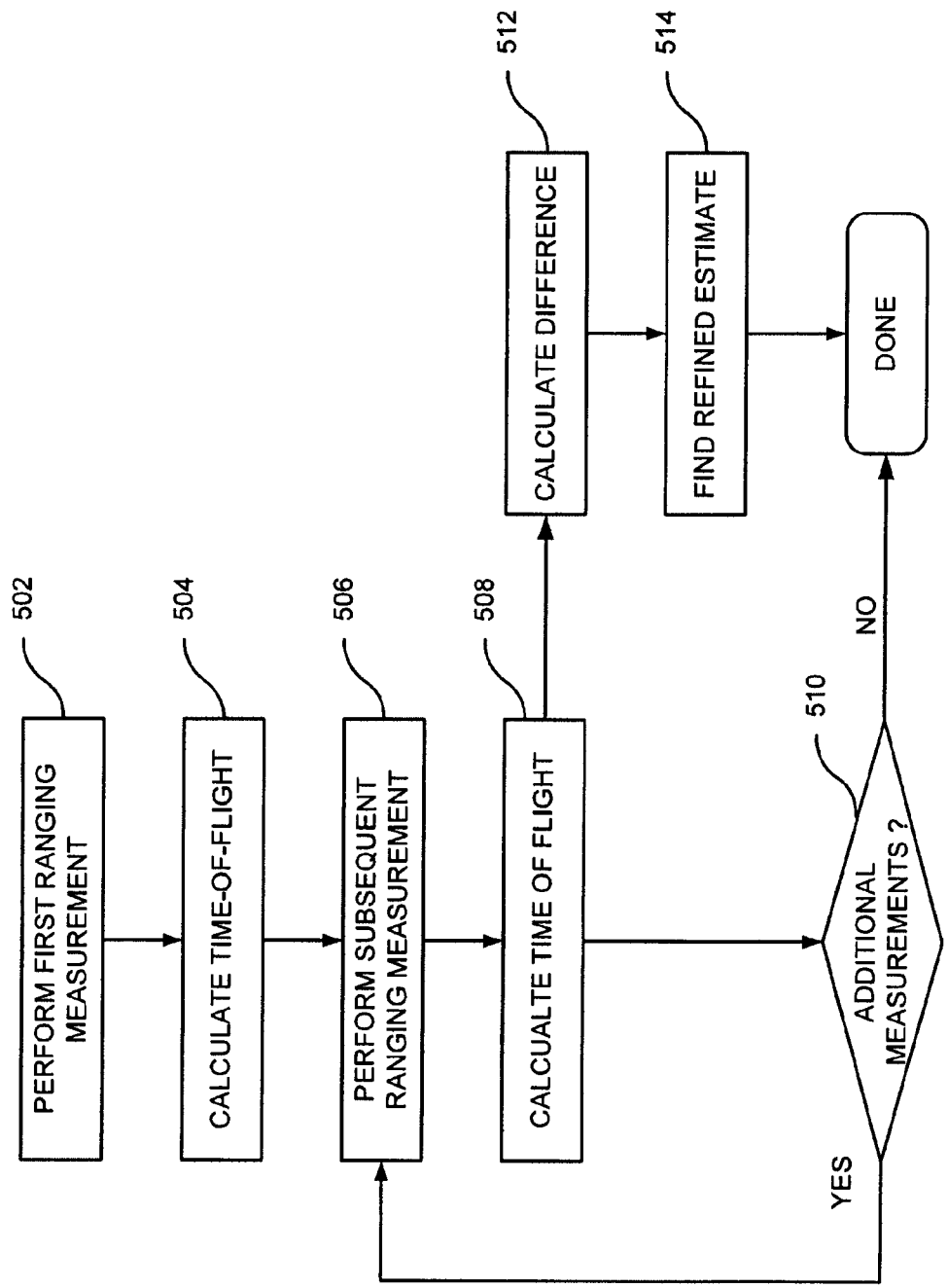
FIG. 5 is a flow diagram illustrating a process for improving accuracy with subsequent measurements in accordance with another embodiment of the invention.

FIG. 5 is an operational flow diagram illustrating a process for improving the accuracy of two-way ranging measurements in accordance with one embodiment of the invention. Referring now to FIG. 5, in step 502, a first ranging estimate between two devices (for example, devices 102, 104 in a wireless network) is performed. In step 504 a time of flight estimate is made. In one embodiment, this measurement and estimate are made in accordance with the techniques described above with reference to FIGS. 2, 3 and 4.

In steps 506 and 508 a subsequent measurement and estimate are made, this time with a clock phase offset introduced. In one embodiment, the offset is an offset of the clock of device 102 relative to the phase of the clock of device 102 in the prior measurement.

In step 512, the relationship between the first and second estimates of time of flight is computed and is used to determine the refined estimate of time of flight in step 514. In one embodiment, the relationship used is the difference between the first and second estimates. As illustrated by step 510, additional measurements and estimates can be made, and the relationships between those measurements (for example, differences) used to further refine the time-of-flight estimate. In a preferred embodiment, when more than one subsequent measurement is used, each subsequent estimate is compared to the first estimate in determining differences. In another embodiment, each subsequent estimate is compared to its immediately preceding estimate to determine the difference between the two. As these examples illustrate, other techniques can be implemented to determine relationships among the various measurements.

The difference provides more precise knowledge of the uncertainty due to finite clock resolution and the refined estimator works by compensating the right amount of bias based on the difference. In one embodiment, this difference is computed in terms of cycles. This is described in more detail below in accordance with the various embodiments of the invention.

More particularly, in one embodiment, in step 514 the appropriate amount of compensated bias is obtained by mapping the differences between the measured times of flight into a plane representing the offset and the fractional portion of the measurement, translating the regions of the plane into functions of uncertainties and bounding the uncertainties. Additionally, the confidence interval for a given measurement can be computed and compared to previous measurements. Examples of this are described in more detail below.

To better describe the invention and its features, a simplified case is first described in accordance with a few basic assumptions. These assumptions do not necessarily conform to real-world environments, but they allow the effects of a finite clock resolution to be described and viewed, with minimal or no impact from other sources of error or inaccuracy. The assumptions are as follows: (1) the clock frequencies in the two devices 102, 104 are the same; (2) there is no frequency drift in the clocks; (3) there is no time gap between the generation and transmission of the reference signal at the transmitter, and similarly there is no time gap between the detection and arrival of the reference signal at the receiver; and (4) the detection of the arrived signal is perfect and detected in the next immediate tick of the sampling clock from its arrival instant. Because the clocks are assumed to operate at the same frequency, the analysis can be performed with the measurements of the same clock period (number of clock cycles). The remaining assumptions allow description in a simplified case without additional sources of inaccuracy except the finite time resolution of the clock. Examples are also discussed later in this document that relax these assumptions, and consider the effect of clock drift in ranging operations.

Figure 6:
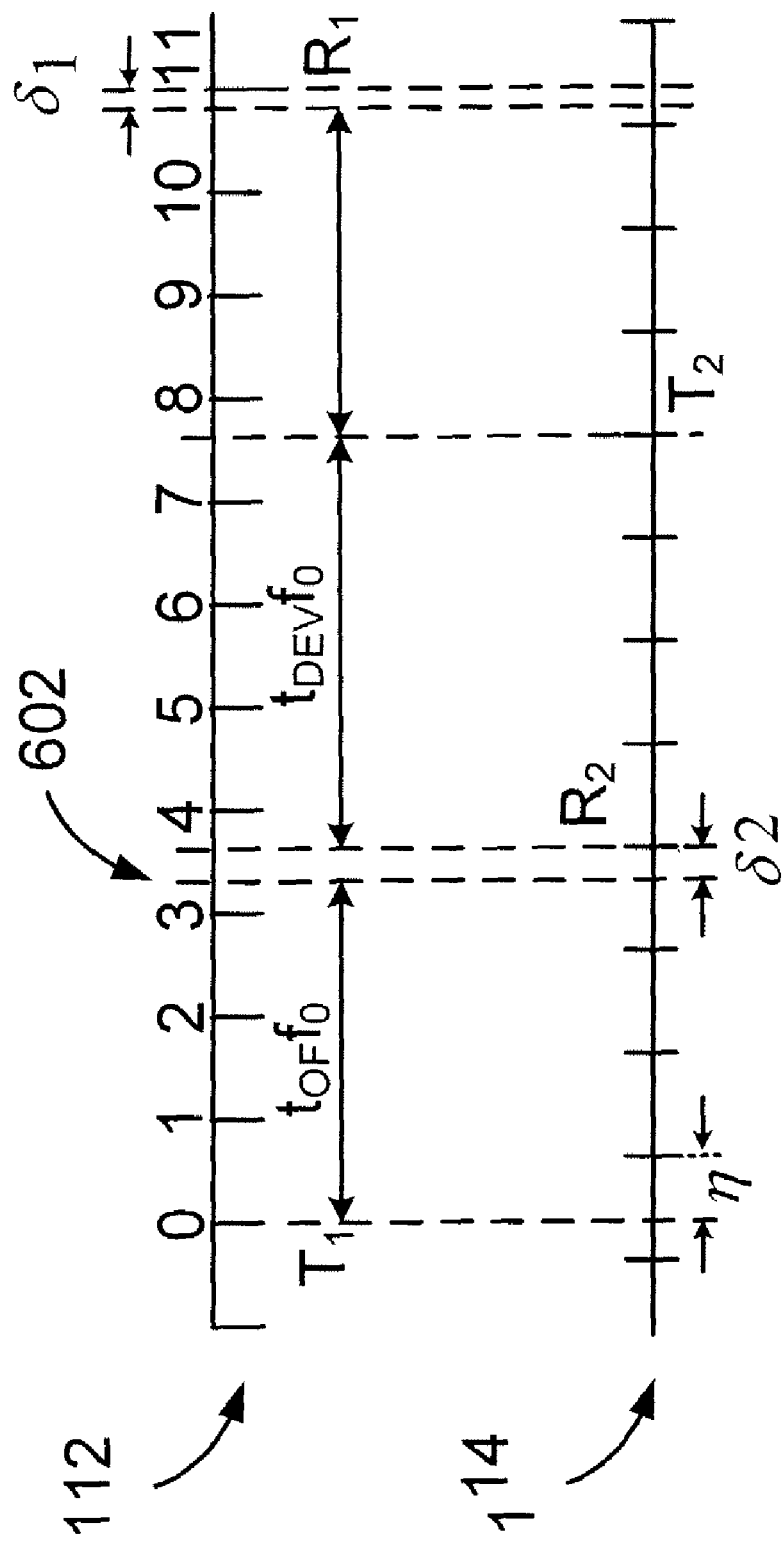
FIG. 6 is a diagram illustrating an example of inaccuracies, $\delta_1$ and $\delta_2$, due to finite clock resolution.

FIG. 6 is a diagram illustrating a two-way-ranging operation between devices 102, 104, each operating at a finite clock resolution, with an offset between the two clocks. Referring now to FIG. 6, the upper line indicates the clock cycles of device 102, while the lower line indicates the clock cycles of device 104. As the diagram serves to illustrate, the inaccuracies $\delta_1$ and $\delta_2$ in the ranging measurements are due to finite clock resolution. More particularly, the inaccuracies $\delta_1$ and $\delta_2$ in the ranging measurements are due to the fact that in the example illustrated the actual time of receipt falls in between clock cycles of the receiving device. Therefore, receipt is not logged until the next clock interval.

Referring still to FIG. 6, the set of measurements involved in this embodiment of two-way-ranging includes T1, T2, R1 and R2 as described above with reference to FIG. 3. T1 and R1 represent the counter values (in clock cycles) of device 102 at the time of transmission and reception, respectively, of a packet at device 102. R2 and T2 represent the counter values (in clock cycles) of device 104 at the time of reception and transmission, respectively, of a packet at device 104.

In the example illustrated, the clocks between the two devices are asynchronous and therefore, there is a constant time offset η between the two clocks of devices 102, 104. The offset in this case is less than one clock cycle, or $0 \leq \eta < 1$. More particularly, in FIG. 6, η is the time-offset between two clocks of device 102 and device 104 that exists during the first transaction. T1 is the clock measurement (counter value) occurring at the device 102 when the ranging measurement packet 112 is transmitted (remembering assumption 3), R2 is the clock measurement at device 104 when packet 112 is received by device 104 (also remembering assumption 3), and $t_{OF}$ is the exact time of flight between the transmitter and the receiver. Note that due to finite clock resolution, $\delta_2$ is the inaccuracy introduced in the measurement R2. That is, the packet is received at a time 602, but is not measured until a time R2. Therefore, R2–$\delta_2$ is actual time 602 when packet 112 is received (or arrives at the receive antenna per assumption 3). In other words, $\delta_2$ is the amount of time elapsed between the actual time of receipt of the packet at device 104 and the time at which that device's clock triggers detection of the packet.

While $\delta_2$, η, T1 and R2 are expressed here in the unit of clock cycles, the time of flight, $t_{OF}$, is an actual elapsed time, for example, time expressed in seconds. Therefore, with $f_0$ as the clock frequency of the two devices, $\delta_2$ can be expressed in terms of η as the difference between the time the signal is measured as being received less the offset η and the actual time it is received less the offset η. This is shown in equation (3) where the receive event 602 is subtracted from the measured event at R2, where R2 is expressed as a ceiling function of the receive time 602 (i.e., the actual receive time 602 is rounded up to the next clock interval at R2).

$$\delta_2 = \lceil t_{OF} \cdot f_0 - \eta \rceil - (t_{OF} \cdot f_0 - \eta). \quad (3)$$

As stated above with reference to FIG. 3, $T_2$ is the clock measurement in device 104 when the acknowledge packet, for example, return packet 114, leaves the transmit antenna of device 104. Note that $t_{DEV} \cdot f_0 = T_2 - R_2$ represents an integer number of clock cycles. $R_1$ is the measurement at device 102 when return packet 114 arrives at the receive antenna with an inaccuracy $\delta_1$ expressed as:

$$\delta_1 = \lceil \eta + t_{OF} \cdot f_0 + \lceil t_{OF} \cdot f_0 - \eta \rceil \rceil - (\eta + t_{OF} \cdot f_0 + \lceil t_{OF} \cdot f_0 - \eta \rceil) \quad (4)$$
$$= \lceil \eta + t_{OF} \cdot f_0 \rceil - (\eta + t_{OF} \cdot f_0)$$

Because the time of flight may not coincide with an exact integer number of clock cycles, the actual number of cycles in the time of flight has an integer portion and a fractional portion, ε. As such, the time of flight in cycles, $t_{OF} \cdot f_0$, can be expressed as $t_{OF} \cdot f_0 = (t_{OF} \cdot f_0)_{int} + \epsilon$, where $(t_{OF} \cdot f_0)_{int}$ is the integer number of the clock period and ε is the fractional portion of the time-of-flight clock period, where ε is less than one clock cycle.

With this expression of the time of flight as a whole and fractional portion, equations (4) and (3) can be further simplified. More particularly, inaccuracy $\delta_1$ can be expressed as the ceiling function of the sum of the fractional portion of the time-of-flight clock period plus the offset, less the actual sum of these components as follows $$\delta_1 = \lceil \epsilon + \eta \rceil - (\epsilon + \eta). \quad (5)$$

Likewise, $\delta_2$ can be expressed as the ceiling function of the fractional portion of the time-of-flight clock period minus the clock offset, less the actual difference of these components as follows $$\delta_2 = \lceil \epsilon - \eta \rceil - (\epsilon - \eta). \quad (6)$$

Thus, $\delta_1$ and $\delta_2$ can be expressed independently of $(t_{OF} \cdot f_0)_{int}$.

Because the actual value of the fractional part of the time of flight, ε, is unknown and the clocks of the devices are not synchronized, ε and η are uniformly distributed over a range of 0 to 1. Because ε and η are independent variables of uniform distribution, it can be proven using probability theory and it is understood by one of ordinary skill in the art that the two variables derived from them using equations (5) and (6), $\delta_1$ and $\delta_2$, are also uniformly distributed.

With the measurements $T_1$, $R_1$ in device 102 and $T_2$, $R_2$ in device 104, the estimate of number of clock cycles elapsed during time of flight $\hat{t}_{OF}$ is determined by measuring the total round trip travel time in cycles, less the processing time at device 104 in cycles and dividing this by two to get the number of cycles for a one-way trip as shown in equation (7). Another way to express the estimated number of clock cycles during time of flight, $\hat{t}_{OF}$, is to express it in terms of the actual time of flight plus the inaccuracies (i.e., the actual one-way time-of-flight cycles plus ½ of the number of cycles due to round trip inaccuracies), as also illustrated in equation (7):

$$\hat{t}_{OF} \cdot f_0 = \frac{(R_1 - T_1) - (T_2 - R_2)}{2} \quad (7)$$
$$= t_{OF} \cdot f_0 + \frac{\delta_1 + \delta_2}{2}.$$

Because $\delta_1$ and $\delta_2$ are each less than one clock cycle in duration, (i.e., $0 \leq \delta_1 < 1$ and $0 \leq \delta_2 < 1$), the uncertainty in the estimate $\hat{t}_{OF}$ is less than 1 clock period. In other words, $(\hat{t}_{OF} - t_{OF}) \cdot f_0 < 1$. Further, from equation (7), it is evident that with the increase of the sampling clock-frequency $f_0$, the uncertainty of the estimate, $\hat{t}_{OF}$, is reduced in an inversely proportional manner.

Having thus described how an increase in sampling clock frequency can improve the accuracy of ranging measurements, techniques for achieving improvements in ranging accuracy without necessarily increasing the clock rate are now described. More particularly, in one embodiment, a reduction similar to that obtained by increasing clock sampling-frequency can be obtained by implementing ranging techniques that incorporate additional ranging measurements with clock-period time-offsets introduced in one or more measurements. In one embodiment, one of the device clocks is offset relative to a prior measurement for subsequent ranging operations. The offset may be purposely induced into the system, or may be achieved by drift or other anomalies or factors that cause clocks to change over time. In one embodiment, the clock offset is introduced in one device clock relative to the other device clock. Additionally, in one embodiment, the relative offset introduced between the two clocks may be considered to be less than one clock cycle, although greater offsets (greater than one or more clock cycle(s)) may be encountered and addressed as well.

First, consider an example communication system where data transmission is assumed to occur at approximately the speed of light, c. With $c=3\times10^{10}$ cm/sec, the estimate of the distance between two devices is given by $$\hat{d} = \hat{t}_{OF} \cdot c = t_{OF} \cdot c + \frac{\delta_1 + \delta_2}{2} \cdot \frac{c}{f_0} \quad (8)$$

$$= d + \frac{\delta_1 + \delta_2}{2} \cdot \frac{c}{f_0}.$$

Consider, for example, a system having a default minimum clock frequency $f_0=528$ MHz. In this example, the uncertainty in the estimated distance between two devices can be as much as approximately 56.8 cm. To find the distribution of uncertainty v due to finite clock resolution, i.e., $v:=(\delta_1+\delta_2)/2$, consider that $\delta_1$ and $\delta_2$ are independent and thus the distribution of $\delta_1+\delta_2$ is the convolution of two probability density functions, and the probability density function $v:=(\delta_1+\delta_2)/2$ is therefore triangular and given by:

$$f_V(v) = \begin{cases} 4v & 0 \le v \le \frac{1}{2} \\ -4v + 4 & \frac{1}{2} < v \le 1 \end{cases}.$$

Because the estimated number of cycles equals the actual number of cycles plus the uncertainty, or $\hat{t}_{OF}\cdot f_0 = t_{OF}\cdot f_0 + v$, an unbiased estimator $\check{t}_{OF}\cdot f_0 = \hat{t}_{OF}\cdot f_0 - E(v) = \hat{t}_{OF}\cdot f_0 - 0.5$ can be determined where $E(v)$, the mean of the random variable $v$, is subtracted from the biased estimator. The distribution of v can be exploited in finding a suitable confidence interval $\Delta$ such that there is a probability $\gamma$ that the actual number of cycles, $t_{OF}\, f_0$, lies within $\pm\Delta$ of the estimator time of flight. That is, the probability that $t_{OF}\cdot f_0$, lies between $\check{t}_{OF}\cdot f_0-\Delta$ and $\check{t}_{OF}\cdot f_0+\Delta$ is $\gamma$. Therefore, for a given $\pm\Delta$, this probability $\gamma$ can be calculated as shown in equation (9), where the actual number of clock cycles for the time of flight is bounded by an estimator time of flight plus the confidence interval $\pm\Delta$. Substituting $E(v)$ and solving for $\Delta$ shows the confidence interval.

$$P\big((\check{t}_{OF}\cdot f_0 - \Delta) \le t_{OF}\cdot f_0 \le (\check{t}_{OF}\cdot f_0 + \Delta)\big) = \gamma \quad (9)$$

$$\Rightarrow P((t_{OF}\cdot f_0 + 0.5 - \Delta) \le \hat{t}_{OF}\cdot f_0 \le (t_{OF}\cdot f_0 + 0.5 + \Delta)) = \gamma$$

$$\Rightarrow 1-(1-2\Delta)^2 = \gamma$$

$$\Rightarrow \Delta = \frac{1\pm\sqrt{1-\gamma}}{2}, 0 \le \Delta \le \frac{1}{2}$$

Thus, the ranging estimate for the distance is given by $\hat{d}=\check{t}_{OF}\cdot c$ and the confidence interval of the ranging estimator $\hat{d}$ is denoted as $\Delta_d$, which is related to $\Delta$ as $\Delta_d=(\pm\Delta\cdot c)/f_0$, where $\Delta$ and $\Delta_d$ are calculated for different values of $\gamma$ and shown in Table 1. As this illustrates, there is a 99% level of confidence that the inaccuracy of the estimate is less than or equal to 0.45 clock-cycle. At an example clock-frequency $f_0=528$ MHz, this inaccuracy translates to 25.56 cm in distance.

TABLE 1

Confidence interval $\Delta$ of $\check{t}_{OF}\cdot f_0$ for different level of confidence

| Probability (Level of Confidence) $\gamma$ | Confidence Interval $\pm\Delta$ (in clock-periods or cycles) | Confidence Interval (in cm) $\Delta_d = \pm\Delta\cdot\frac{c}{f_0}$ $c = 3\times10^{10}$ cm/sec, $f_0 = 528\times10^6$ cycle/sec |
|---|---|---|
| 1 | 0.5 | 28.40 |
| 0.99 | 0.45 | 25.56 |
| 0.9 | 0.34 | 19.31 |
| 0.8 | 0.28 | 15.90 |

As stated above, in one embodiment, one or more subsequent measurements with a relative clock-offset are used in two-way ranging to increase the accuracy of the ranging. In particular, in accordance with one embodiment, the confidence interval of the estimate of the time of flight (in clock-cycles) can be reduced by a factor of N without decreasing the level of confidence when additional ranging measurements for a clock period offset of n/N, where n=1, . . . , N−1 are used. To facilitate description of this technique, it is described in terms of an example embodiment where the clock offset introduced is roughly one-half of a clock period. After the invention is described in terms of a ½ period offset, the more general case of an n/N offset is described below.

As stated above, in one embodiment ranging measurements are made with ½ clock period offset with respect to the previous ranging measurements in device 102 to reduce the uncertainty of the estimation of time of flight, $t_{OF}$. FIG. 7 is a diagram illustrating two ranging measurements with ½ clock period offset according to one embodiment of the invention. More particularly, FIG. 7(a) illustrates the ranging inaccuracy due to $\delta_1$ and $\delta_2$ and insertion of ½ clock period time-offset in device 102 clock, FIG. 7(b) illustrates the relation between time-offset $\eta$ and $(\eta)_{1/2}$ (with ½ clock-period offset) when ½<$\eta$<1, and FIG. 7(c) illustration the relation where 0<$\eta$<½.

Figure 8:
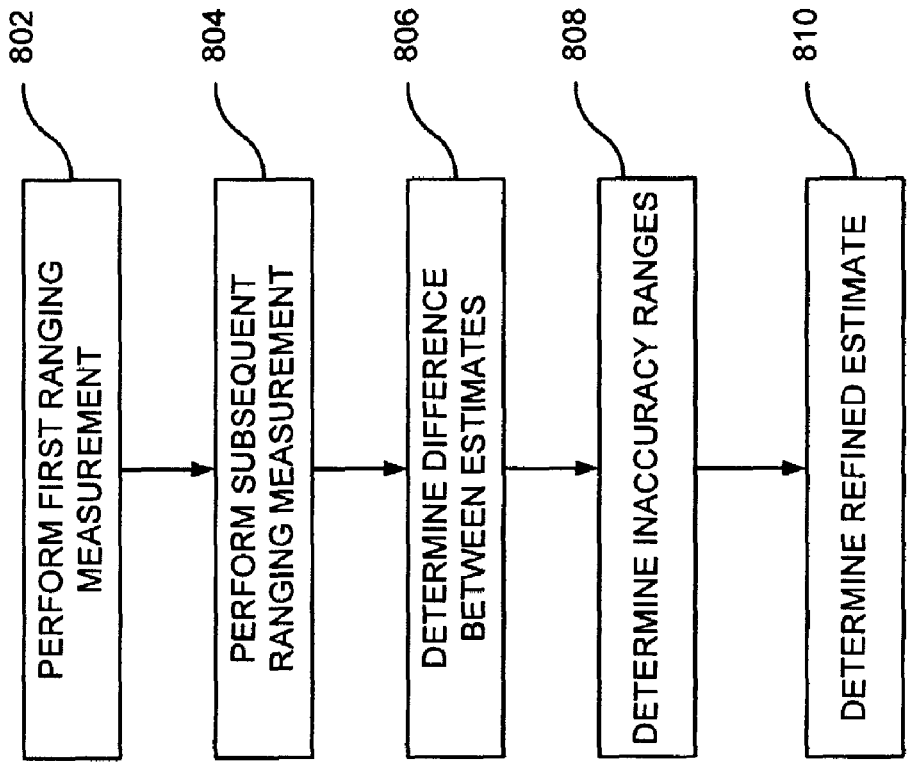
FIG. 8 is an operational flow diagram illustrating a process according to one embodiment for improving ranging accuracy in accordance with the example embodiment illustrated in FIG. 7.

FIG. 8 is an operational flow diagram illustrating a process for improving ranging accuracy in accordance with the example embodiment illustrated in FIG. 7. Referring now to FIGS. 7 and 8, two measurements are illustrated as a first measurement 702 and a second measurement 704. In a step 802, a first measurement of $t_{OF}$ is made with clock of device 102 and clock of device 104, wherein the clocks are asynchronous and have some offset $\eta$ associated therewith. In one embodiment, this measurement can be made as described above with reference to FIG. 4.

In a step 804, a second measurement is conducted. For the second measurement 704, the clock in device 102 is offset by ½ a clock period relative to the phase of its clock in the prior measurement 702. In a scenario where the clock in device 104 is assumed fixed with no drift, this offset is also relative to the clock in device 104. For this measurement, then, the time-offset between two clocks, denoted as $(\eta)_{1/2}$, after introducing ½ clock period time-offset in the clock of device 102 is now:

$$(\eta)_{1/2} = \begin{cases} \eta - \frac{1}{2} & \eta \geq \frac{1}{2} \\ \eta + \frac{1}{2} & \eta < \frac{1}{2} \end{cases} \quad (10)$$

The new time of flight, $t_{OF}$, for this second measurement is computed as described above, but using timing measurements $(T_1)_{1/2}$, $(T_2)_{1/2}$, $(R_1)_{1/2}$, and $(R_2)_{1/2}$ as shown in FIG. 7.

Thus, the time of flight for the second measurement is estimated based on the transmission and reception times of the packet as described above. This provides:

$$(\hat{t}_{OF})_{1/2} \cdot f_0 = \frac{((R_1)_{1/2} - (T_1)_{1/2}) - ((T_2)_{1/2} - (R_2)_{1/2})}{2} \quad (11)$$

$$= t_{OF} \cdot f_0 + \frac{(\delta_1)_{1/2} + (\delta_2)_{1/2}}{2},$$

where $$(\delta_1)_{1/2} = \lceil \varepsilon + (\eta)_{1/2} \rceil - (\varepsilon + (\eta)_{1/2}), \text{ and} \quad (12)$$

$$(\delta_2)_{1/2} = \lceil \varepsilon - (\eta)_{1/2} \rceil - (\varepsilon - (\eta)_{1/2}), \quad (13)$$

with $(\eta)_{1/2}$ as defined in equation (10).

In a step 806, the difference between the time of flight estimates is determined. In one embodiment, this is accomplished by subtracting equation (11) from equation (7), to obtain $$(\hat{t}_{OF} - (\hat{t}_{OF})_{1/2}) \cdot f_0 = \frac{\delta_1 - (\delta_1)_{1/2}}{2} + \frac{\delta_2 - (\delta_2)_{1/2}}{2}. \quad (14)$$

Substituting the values obtained from equations (5), (6), (12) and (13) into equation (14) yields.

$$(\hat{t}_{OF} - (\hat{t}_{OF})_{1/2}) \cdot f_0 = \frac{1}{2}(\lceil \varepsilon + \eta \rceil - \lceil \varepsilon + (\eta)_{1/2} \rceil + \lceil \varepsilon - \eta \rceil - \lceil \varepsilon - (\eta)_{1/2} \rceil). \quad (15)$$

Substituting the value of $(\eta)_{1/2}$ as defined in equation (10) into equation (15), yields:

$$(\hat{t}_{OF} - (\hat{t}_{OF})_{1/2}) \cdot f_0 = \quad (16)$$

$$\begin{cases} \frac{1}{2}\left(\lceil \varepsilon + \eta \rceil - \left\lceil \varepsilon + \eta - \frac{1}{2} \right\rceil + \lceil \varepsilon - \eta \rceil - \left\lceil \varepsilon - \left(\eta - \frac{1}{2}\right) \right\rceil\right) & \eta \geq \frac{1}{2} \\ \frac{1}{2}\left(\lceil \varepsilon + \eta \rceil - \left\lceil \varepsilon + \eta + \frac{1}{2} \right\rceil + \lceil \varepsilon - \eta \rceil - \left\lceil \varepsilon - \left(\eta + \frac{1}{2}\right) \right\rceil\right) & \eta < \frac{1}{2} \end{cases}$$

The expression of $\eta < \frac{1}{2}$ in (16) can be written as $$(\hat{t}_{OF} - (\hat{t}_{OF})_{1/2}) \cdot f_0 = \frac{1}{2}\left(\lceil \varepsilon + \eta \rceil - \left\lceil \varepsilon + \eta + 1 - \frac{1}{2} \right\rceil + \lceil \varepsilon - \eta \rceil - \right.$$

$$\left. \left\lceil \varepsilon - \left(\eta + 1 - \frac{1}{2}\right) \right\rceil\right), \eta < \frac{1}{2}$$

$$= \frac{1}{2}\left(\lceil \varepsilon + \eta \rceil - \left\lceil \varepsilon + \eta - \frac{1}{2} \right\rceil + \lceil \varepsilon - \eta \rceil - \right.$$

$$\left. \left\lceil \varepsilon - \left(\eta - \frac{1}{2}\right) \right\rceil\right)$$

Thus, $(\hat{t}_{OF} - (\hat{t}_{OF})_{1/2}) \cdot f_0$ can be expressed entirely in terms of the offset $\eta$ and the fractional portion of the time of flight $\varepsilon$ as:

$$(\hat{t}_{OF} - (\hat{t}_{OF})_{1/2}) \cdot f_0 = \quad (17)$$

$$\frac{1}{2}\left(\lceil \varepsilon + \eta \rceil - \left\lceil \varepsilon + \eta - \frac{1}{2} \right\rceil + \lceil \varepsilon - \eta \rceil - \left\lceil \varepsilon - \left(\eta - \frac{1}{2}\right) \right\rceil\right), 0 \leq \eta < 1$$

which can be evaluated in terms of $\varepsilon$ and $\eta$. In one embodiment, this expression can be evaluated in the ($\varepsilon$, $\eta$) plane.

Figure 9:
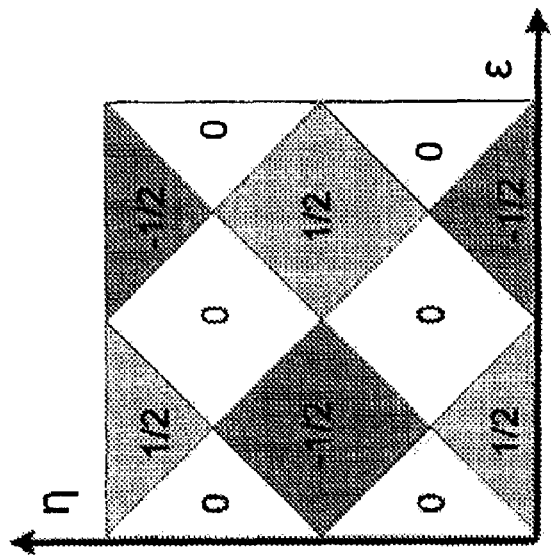
FIG. 9 is a diagram illustrating $(\hat{t}_{OF}-(\hat{t}_{OF})_{1/2})\cdot f_0$ to mapped in the ($\epsilon$, $\eta$) plane for values of $\epsilon+\eta$, $\epsilon-\eta$, $\epsilon+\eta-½$ and $\epsilon-\eta-½$.

In a step 808, a range of the inaccuracies, $\delta_1$ and $\delta_2$, is determined. FIG. 9 is a diagram illustrating $(\hat{t}_{OF} - (\hat{t}_{OF})_{1/2}) \cdot f_0$ mapped in the ($\varepsilon$, $\eta$) plane for values of $\varepsilon + \eta$, $\varepsilon - \eta$, $\varepsilon + \eta - \frac{1}{2}$, and $\varepsilon - \eta - \frac{1}{2}$. Because $\delta_1$ and $\delta_2$ are determined based on ceiling functions of $\varepsilon$, $\eta$ operations, the analysis can be somewhat simplified. Particularly, respective determinations of the ceiling functions of the operations $\varepsilon + \eta$, $\varepsilon - \eta$, $\varepsilon + \eta$, $\eta - \frac{1}{2}$, and $\varepsilon - \eta - \frac{1}{2}$ will be either 0, 1 or 2. As such, the difference in measurements in cycles, $D_{1/2} = (\hat{t}_{OF} - (\hat{t}_{OF})_{1/2}) \cdot f_0$, will be either $-\frac{1}{2}$, 0 or $+\frac{1}{2}$ as illustrated in FIG. 9.

The different regions of $(\hat{t}_{OF} - (\hat{t}_{OF})_{1/2}) \cdot f_0$ in the ($\varepsilon$, $\eta$) plane can be translated to the functions of $\delta_1$ and $\delta_2$ with the help of FIG. 10. FIGS. 10(*a*) and 10(*b*) illustrate the case where the ($\varepsilon$, $\eta$) plane is separated with respect to $\delta_1 \geq \frac{1}{2}$, $\delta_1 < \frac{1}{2}$ and $\delta_2 \geq \frac{1}{2}$, $\delta_2 < \frac{1}{2}$ respectively. FIG. 10(*c*), illustrates the case where the ($\varepsilon$, $\eta$) plane is separated as a joint function of $\delta_1$ and $\delta_2$ on the basis of $\delta_1 < \frac{1}{2}, \delta_2 < \frac{1}{2}$, $\delta_1 < \frac{1}{2}, \delta_2 \geq \frac{1}{2}$, $\delta_1 \geq \frac{1}{2}$, $\delta_2 < \frac{1}{2}$, and $\delta_1 \geq \frac{1}{2}, \delta_2 \geq \frac{1}{2}$. Comparing FIG. (9) with FIG. 10(*c*), three cases can be determined. In a first case, when $(\hat{t}_{OF} - (\hat{t}_{OF})_{1/2}) \cdot f_0 = -\frac{1}{2}$ it can be determined that $0 < \delta_1 < \frac{1}{2}$, $0 < \delta_2 < \frac{1}{2}$ and $0 < (\delta_1 + \delta_2)/2 < \frac{1}{2}$ with a probability of one quarter. In a second case, when $(\hat{t}_{OF} - (\hat{t}_{OF})_{1/2}) \cdot f_0 = 0$ it can be determined that $0 < \delta_1 < \frac{1}{2}$, $\frac{1}{2} < \delta_2 < 1$, or $\frac{1}{2} < \delta_1 < 1$, $0 < \delta_2 < \frac{1}{2}$, and $\frac{1}{4} \leq (\delta_1 + \delta_2)/2 \leq \frac{3}{4}$, with probability of one half. In a third case, when $(\hat{t}_{OF} - (\hat{t}_{OF})_{1/2}) \cdot f_0 = \frac{1}{2}$ it can be determined that $\delta_1 \geq \frac{1}{2}$ and $\delta_2 \geq \frac{1}{2}$, and $\frac{1}{2} < (\delta_1 + \delta_2)/2 < 1$ with a probability of occurrence of one quarter.

Therefore, by employing a one-half clock-period time-offset to one clock relative to the other and knowing the difference between the two time-of-flight measurements, $(\hat{t}_{OF} - (\hat{t}_{OF})_{1/2}) \cdot f_0$, it can be determined whether $(\delta_1 + \delta_2)/2$ is less than 0.5, or in between 0.25 and 0.75, or is greater than 0.5. Therefore, the maximum inaccuracy in the round-trip estimate is reduced to no more than one-half of a clock cycle. As such, the uncertainty of the measurement can be reduced by one-half of a clock period.

Knowing the difference between the two time-of-flight measurements (as determined in step 806), $(\hat{t}_{OF} - (\hat{t}_{OF})_{1/2}) \cdot f_0$, in step 810, the refined estimate can be calculated and compared with the measurement case where there was no time offset.

The three cases of $(\hat{t}_{OF} - (\hat{t}_{OF})_{1/2}) \cdot f_0 = -\frac{1}{2}$, $(\hat{t}_{OF} - (\hat{t}_{OF})_{1/2}) \cdot f_0 = 0$, and $(\hat{t}_{OF} - (\hat{t}_{OF})_{1/2}) \cdot f_0 = \frac{1}{2}$ are now discussed. With the first case, where the difference between the first measurement and the measurement with a one-half clock period offset is minus one-half of a clock cycle, $(\hat{t}_{OF} - (\hat{t}_{OF})_{1/2}) \cdot f_0 = -\frac{1}{2}$ the values for the inaccuracies, $\delta_1$ and $\delta_2$, are as follows $$0 < \delta_1 < \frac{1}{2}$$

$$0 < \delta_2 < \frac{1}{2}$$

Because $\delta_1$ and $\delta_2$ are independent, the probability density function of $\delta_1 + \delta_2$ can be determined as the convolution of two uniform probability density functions $U(0, 0.5)$ resulting in a triangular function. Thus, the probability density function of $v = (\delta_1 + \delta_2)/2$ is given by:

$$f_v(v) = \begin{cases} 16v & 0 \leq v \leq \frac{1}{4} \\ 8 - 16v & \frac{1}{2} \leq v \leq \frac{1}{2} \end{cases}.$$

Thus an unbiased estimate can be formed as $\check{t}_{OF} \cdot f_0 = \hat{t}_{OF} \cdot f_0 - 0.25$ and the confidence interval, $\pm \Delta$, for confidence $\gamma$ as $$P(\check{t}_{OF} \cdot f_0 - \Delta \leq t_{OF} \cdot f_0 \leq \check{t}_{OF} \cdot f_0 + \Delta) = \gamma$$
$$\Rightarrow 16\Delta^2 - 8\Delta + \gamma = 0$$
$$\Rightarrow \Delta = \frac{1 \pm \sqrt{1-\gamma}}{4}, 0 \leq \Delta \leq \frac{1}{4}$$

Values of the confidence intervals $\Delta$ for different $\gamma$ are tabulated below.

TABLE 2

Confidence interval $\Delta$ of $\check{t}_{OF}$ for different levels of confidence with a half-period clock offset (Case I, II and III), where the confidence interval $\Delta_d = \pm \Delta \cdot \frac{c}{f_0}$ is in cm, and $c = 3 * 10^{10}$ cm/sec and $f_0 = 528 * 10^6$ cycles/sec.

| Probability $\gamma$ (confidence level) | Confidence Interval $\pm \Delta$ (in clock-period or cycle) | Confidence Interval $\Delta_d = \pm \Delta \cdot \frac{c}{f_0}$ |
|---|---|---|
| 1 | 0.25 | 14.20 |
| 0.99 | 0.225 | 12.78 |
| 0.9 | 0.1709 | 9.71 |
| 0.8 | 0.138 | 7.83 |

Similarly, when $(\hat{t}_{OF} - (\hat{t}_{OF})_{1/2}) \cdot f_0 = 0$, we know that $0 < \delta_1 < \frac{1}{2}$ and $\frac{1}{2} < \delta_2 < 1$ or $0 < \delta_2 < \frac{1}{2}$ and $\frac{1}{2} \leq \delta_1 < 1$. Thus, due to independence of $\delta_1$ and $\delta_2$ the PDF of $\delta_1 + \delta_2$ is the convolution of $U(0,0.5)$ and $U(0.5,1)$ resulting to the probability density function of $v = (\delta_1 + \delta_2)/2$ as $$f_V(v) = \begin{cases} 16v - 4 & 0.25 \leq v \leq 0.5 \\ -16v + 12 & 0.5 < v \leq 0.75 \end{cases}.$$

Consequently, an unbiased estimate can be made as $\check{t}_{OF} \cdot f_0 = \hat{t}_{OF} \cdot f_0 - 0.5$, and the confidence interval $\Delta$ calculated for a given confidence $\gamma$ as discussed above with the first case scenario. The obtained values of $\Delta$ are same as Case I and tabulated in Table 2.

With $\hat{t}_{OF} - (\hat{t}_{OF})_{1/2} = \frac{1}{2}$, the viable ranges of $\delta_1$ and $\delta_2$ are $\frac{1}{2} \leq \delta_1 < 1$ and $\frac{1}{2} \leq \delta_2 < 1$. The probability density function of $\delta_1 + \delta_2$ is the convolution of $U(0.5,1)$ and $U(0.5,1)$, and accordingly the probability density function of $v = (\delta_1 + \delta_2)/2$ is given by $$f_v(v) = \begin{cases} 16v - 0 & 0.5 \leq v \leq 0.75 \\ -16v + 16 & 0.75 < v \leq 1 \end{cases}.$$

Figure 11:
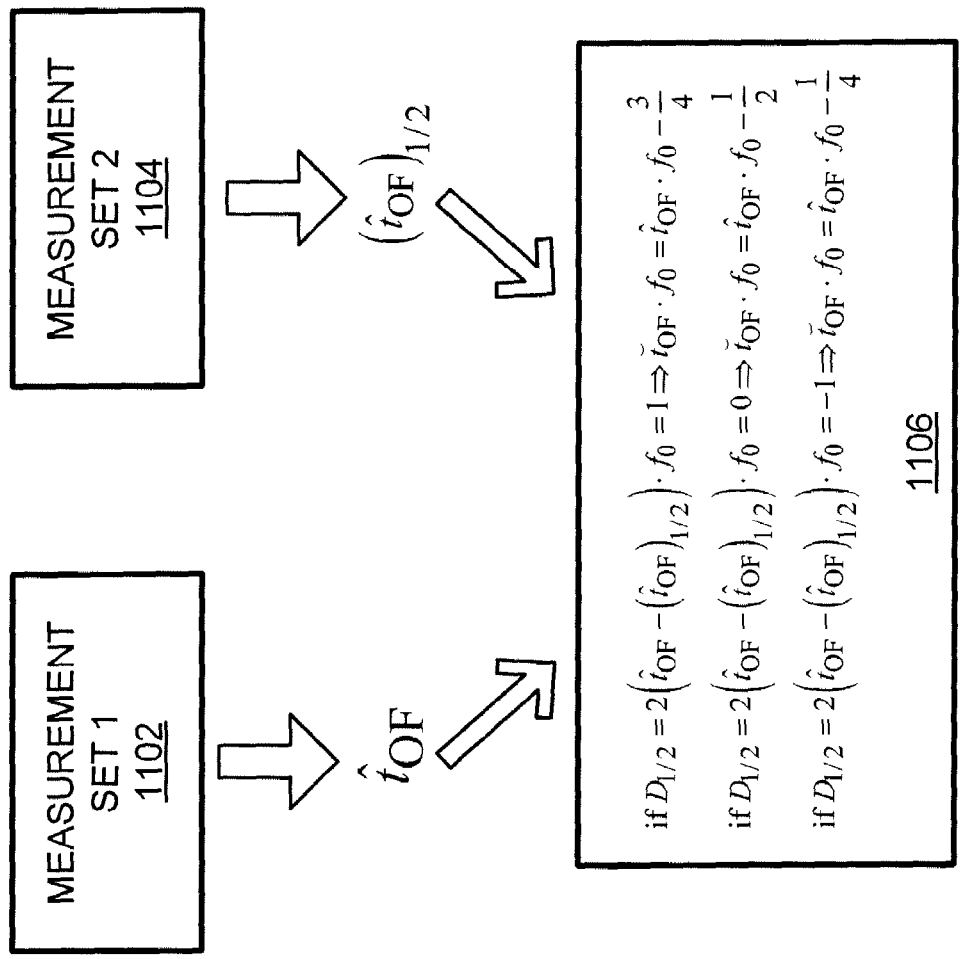
FIG. 11 is a diagram illustrating a summary of multiple ranging measurements with a one-half-clock-period offset in accordance with one embodiment of the invention.

The unbiased estimate is $\check{t}_{OF} \cdot f_0 = \hat{t}_{OF} \cdot f_0 - 0.75$ and confidence intervals of $\Delta$ for different confidence $\gamma$ are same as the Case I and II and are tabulated in Table 2. As Table 2 illustrates, employing subsequent measurements with a one-half of a clock-cycle time offset reduces the confidence interval by one half for a given confidence. That is, the uncertainty in the estimate that arises due to a finite clock resolution is reduced by one half. The ranging algorithm with one-half-clock-period offset measurements is summarized in FIG. 11. Referring now to FIG. 11, a first measurement set is taken 1102 to estimate $\hat{t}_{OF}$. A second measurement set 1104 is taken at $\frac{1}{2}$ clock cycle offset to estimate $(\hat{t}_{OF})_{1/2}$. These measurements are used to compute the refined estimate 1106 as follows:

if $D_{1/2} = 2(\hat{t}_{OF} - (\hat{t}_{OF})_{1/2}) \cdot f_0$
$$= 1 \Rightarrow \check{t}_{OF} = \hat{t}_{OF} - \frac{3}{4}$$

if $D_{1/2} = 2(\hat{t}_{OF} - (\hat{t}_{OF})_{1/2}) \cdot f_0$
$$= 0 \Rightarrow \check{t}_{OF} = \hat{t}_{OF} - \frac{1}{2}$$

if $D_{1/2} = 2(\hat{t}_{OF} - (\hat{t}_{OF})_{1/2}) \cdot f_0$
$$= -1 \Rightarrow \check{t}_{OF} = \hat{t}_{OF} - \frac{1}{4}.$$

These refined estimates can be generalized as if $D_{1/2} = 2(\hat{t}_{OF} - (\hat{t}_{OF})_{1/2}) \cdot f_0 = 1 \Rightarrow \check{t}_{OF} \cdot f_0 = \hat{t}_{OF} \cdot f_0 + c_1$ if $D_{1/2} = 2(\hat{t}_{OF} - (\hat{t}_{OF})_{1/2}) \cdot f_0 = 0 \Rightarrow \check{t}_{OF} \cdot f_0 = \hat{t}_{OF} \cdot f_0 + c_2$ if $D_{1/2} = 2(\hat{t}_{OF} - (\hat{t}_{OF})_{1/2}) \cdot f_0 = -1 \Rightarrow \check{t}_{OF} \cdot f_0 = \hat{t}_{OF} \cdot f_0 + c_3$ where $c_1$, $c_2$ and $c_3$ are constants.

Having thus considered a specific instance where the clock offset between device clocks is one half of a clock period (in other words, N=2 and 1/N=½), the more general case of n/N is now described. More particularly, the case where ranging measurements with n/N, n=0, ..., N−1, clock-offsets are considered for any integer value of N≧1 with n=0, 1, 2, ..., N−1, where n=0 corresponds to the case with no additional clock-offset. Thus, with n/N clock-period time-offset between devices 102, 104, the relationship of time-offset between two devices in equation (10) becomes $$(\eta)_{n/N} = \begin{cases} \eta - \frac{n}{N} & \eta \geq \frac{n}{N} \\ 1 + \eta - \frac{n}{N} & \eta < \frac{n}{N} \end{cases}, n = 0, \ldots, N-1 \quad (18)$$

where $(\eta)_{n/N}$ is the clock-offset between two devices with n/N clock-offset introduced between the devices and with n=0, $(\eta)_{n/N} = \eta$ representing the initial clock-offset that is present between the devices prior to any additional clock-offset measurements.

From a convention perspective, let $(\hat{t}_{OF})_{n/N}$ be the estimated time of flight using an n/N clock-offset. Thus, with the measurement set $(T_1)_{n/N}$, $(R_1)_{n/N}$, $(T_2)_{n/N}$ and $(R_2)_{n/N}$, $(\hat{t}_{OF})_{n/N}$ in cycles can be written as $$(\check{t}_{OF})_{n/N} \cdot f_0 = \frac{((R_1)_{n/N} - (T_1)_{n/N}) - ((T_2)_{n/N} - (R_2)_{n/N})}{2} \quad (19)$$
$$= t_{OF} \cdot f_0 + \frac{(\delta_1)_{n/N} + (\delta_2)_{n/N}}{2},$$

-continued where $(\delta_1)_{n/N} = \lceil \varepsilon + (\eta)_{n/N} \rceil - (\varepsilon + (\eta)_{n/N})$ and $(\delta_2)_{n/N} = \lceil \varepsilon - (\eta)_{n/N} \rceil - (\varepsilon - (\eta)_{n/N})$.

Subtracting equation (19) from equation (7) yields the difference between the two measurements in terms of clock cycles as shown in equation 20.

$$(\hat{t}_{OF} - (\hat{t}_{OF})_{n/N}) \cdot f_0 = \frac{\delta_1 - (\delta_1)_{n/N}}{2} + \frac{\delta_2 - (\delta_2)_{n/N}}{2}. \quad (20)$$

Substituting $\delta_1$, $\delta_2$, $(\delta_1)_{n/N}$ and $(\delta_2)_{n/N}$ into equation (20), yields:

$$D_{n/N} \triangleq 2(\hat{t}_{OF} - (\hat{t}_{OF})_{n/N}) \cdot f_0 \quad (21)$$
$$= \lceil \varepsilon + \eta \rceil - \lceil \varepsilon + \eta - \frac{n}{N} \rceil + \lceil \varepsilon - \eta \rceil - \lceil \varepsilon - (\eta - \frac{n}{N}) \rceil,$$
$$0 \leq \eta < 1$$

with n=0, $D_{n/N}$=0. To evaluate the expression of equation (21), it is noted, as described above that the ceiling functions of mathematical operations of the offset, $\eta$, and the fractional portion of the time of flight, $\varepsilon$, will take on discrete values as shown in equations 22, 23, 24 and 25.

$$\lceil \varepsilon + \eta \rceil = \begin{cases} 1 & 0 < \varepsilon + \eta \leq 1 \\ 2 & 1 < \varepsilon + \eta < 2 \end{cases} \quad (22)$$

$$\lceil \varepsilon - \eta \rceil = \begin{cases} 0 & -1 < \varepsilon - \eta \leq 0 \\ 1 & 0 < \varepsilon - \eta < 1 \end{cases} \quad (23)$$

$$\lceil \varepsilon + \eta - \frac{n}{N} \rceil = \begin{cases} 0 & 0 \leq \varepsilon + \eta \leq \frac{n}{N} \\ 1 & \frac{n}{N} < \varepsilon + \eta \leq 1 + \frac{n}{N} \\ 2 & 1 + \frac{n}{N} < \varepsilon + \eta < 2 \end{cases} \quad (24)$$

$$\lceil \varepsilon - \eta + \frac{n}{N} \rceil = \begin{cases} 0 & -1 \leq \varepsilon - \eta \leq -\frac{n}{N} \\ 1 & -\frac{n}{N} < \varepsilon - \eta \leq 1 - \frac{n}{N} \\ 2 & 1 - \frac{n}{N} < \varepsilon - \eta < 1 \end{cases} \quad (25)$$

Thus, using (22), (24) and (4), yields $$\lceil \varepsilon + \eta \rceil - \lceil \varepsilon + \eta - \frac{n}{N} \rceil = \begin{cases} 1 & 0 < \varepsilon + \eta \leq \frac{n}{N} & 1 - \frac{n}{N} \leq \delta_1 < 1 \\ 0 & \frac{n}{N} < \varepsilon + \eta \leq 1 & 0 \leq \delta_1 < 1 - \frac{n}{N} \\ 1 & 1 < \varepsilon + \eta \leq 1 + \frac{n}{N} & 1 - \frac{n}{N} \leq \delta_1 < 1 \\ 0 & 1 + \frac{n}{N} < \varepsilon + \eta < 2 & 0 < \delta_1 < 1 - \frac{n}{N} \end{cases} \quad (26)$$

Similarly, using (23), (25) and (6), yields $$\lceil \varepsilon - \eta \rceil - \lceil \varepsilon - \eta + \frac{n}{N} \rceil = \begin{cases} 0 & -1 < \varepsilon - \eta \leq -\frac{n}{N} & \frac{n}{N} \leq \delta_2 < 1 \\ -1 & -\frac{n}{N} < \varepsilon - \eta \leq 0 & 0 \leq \delta_2 < \frac{n}{N} \\ \ldots \\ 0 & 0 < \varepsilon - \eta \leq 1 - \frac{n}{N} & \frac{n}{N} \leq \delta_2 < 1 \\ -1 & 1 - \frac{n}{N} < \varepsilon - \eta < 1 & 0 < \delta_2 < \frac{n}{N} \end{cases} \quad (27)$$

Therefore, using (26) and (27), $D_{n/N}$ can be calculated in equation (21) as outlined in Table 3, below. Note that for different values of $D_{n/N}$ at each $\eta$, the sequence $D_{(N-1)/N}$, $D_{(N-2)/N}, \ldots, D_{1/N}$ obtained from the ranging measurements with offsets (N−1)/N, ..., 1/N, respectively, does not include all the combination of the values (1, 0, 0, −1) tabulated in Table 3. Rather, it includes only those sequences that yields a valid overall domain of $\delta_1$ and $\delta_2$ satisfying all the individual domains at each value of $\eta$.

TABLE 3

Possible values of $D_{n/N}$

| Values of $D_{n/N}$ | Domain of $\delta_1$ and $\delta_2$ with $D_{n/N}$ | Domain of $\delta_1$ and $\delta_2$ with $D_{(N-1)/N}$ | Domain of $\delta_1$ and $\delta_2$ with $D_{(N-2)/N}$ | Domain of $\delta_1$ and $\delta_2$ with $D_{(N-3)/N}$ | ... | Domain of $\delta_1$ and $\delta_2$ with $D_{3/N}$ | Domain of $\delta_1$ and $\delta_2$ with $D_{n/N}$ | Domain of $\delta_1$ and $\delta_2$ with $D_{1/N}$ |
|---|---|---|---|---|---|---|---|---|
| 1 | $1 - \frac{n}{N} \leq \delta_1 < 1$ | $\frac{1}{N} \leq \delta_1 < 1$ | $\frac{2}{N} \leq \delta_1 < 1$ | $\frac{3}{N} \leq \delta_1 < 1$ | ... | $1 - \frac{3}{N} \leq \delta_1 < 1$ | $1 - \frac{2}{N} \leq \delta_1 < 1$ | $1 - \frac{1}{N} \leq \delta_1 < 1$ |
|  | $\frac{n}{N} \leq \delta_2 < 1$ | $1 - \frac{1}{N} \leq \delta_2 < 1$ | $1 - \frac{2}{N} \leq \delta_2 < 1$ | $1 - \frac{3}{N} \leq \delta_2 < 1$ |  | $\frac{3}{N} \leq \delta_2 < 1$ | $\frac{2}{N} \leq \delta_2 < 1$ | $\frac{1}{N} \leq \delta_2 < 1$ |
| 0 | $1 - \frac{n}{N} \leq \delta_1 < 1$ | $\frac{1}{N} \leq \delta_1 < 1$ | $\frac{2}{N} \leq \delta_1 < 1$ | $\frac{3}{N} \leq \delta_1 < 1$ | ... | $1 - \frac{3}{N} \leq \delta_1 < 1$ | $1 - \frac{2}{N} \leq \delta_1 < 1$ | $1 - \frac{1}{N} \leq \delta_1 < 1$ |
|  | $0 < \delta_2 < \frac{n}{N}$ | $0 \leq \delta_2 < 1 - \frac{1}{N}$ | $0 \leq \delta_2 < 1 - \frac{2}{N}$ | $0 \leq \delta_2 < 1 - \frac{3}{N}$ |  | $0 < \delta_2 < \frac{3}{N}$ | $0 < \delta_2 < \frac{2}{N}$ | $0 < \delta_2 < \frac{1}{N}$ |
| 0 | $0 \leq \delta_1 < 1 - \frac{n}{N}$ | $0 \leq \delta_1 < \frac{1}{N}$ | $0 \leq \delta_1 < \frac{2}{N}$ | $0 \leq \delta_1 < \frac{3}{N}$ | ... | $0 \leq \delta_1 < 1 - \frac{3}{N}$ | $0 \leq \delta_1 < 1 - \frac{2}{N}$ | $0 \leq \delta_1 < 1 - \frac{1}{N}$ |

TABLE 3-continued

Possible values of $D_{n/N}$

| Values of $D_{n/N}$ | Domain of $\delta_1$ and $\delta_2$ with $D_{n/N}$ | Domain of $\delta_1$ and $\delta_2$ with $D_{(N-1)/N}$ | Domain of $\delta_1$ and $\delta_2$ with $D_{(N-2)/N}$ | Domain of $\delta_1$ and $\delta_2$ with $D_{(N-3)/N}$ | ... | Domain of $\delta_1$ and $\delta_2$ with $D_{3/N}$ | Domain of $\delta_1$ and $\delta_2$ with $D_{n/N}$ | Domain of $\delta_1$ and $\delta_2$ with $D_{1/N}$ |
|---|---|---|---|---|---|---|---|---|
| -1 | $\frac{n}{N} \le \delta_2 < 1$ | $1 - \frac{1}{N} \le \delta_2 < 1$ | $1 - \frac{2}{N} \le \delta_2 < 1$ | $1 - \frac{3}{N} \le \delta_2 < 1$ | ... | $\frac{3}{N} \le \delta_2 < 1$ | $\frac{2}{N} \le \delta_2 < 1$ | $\frac{1}{N} \le \delta_2 < 1$ |
|  | $0 \le \delta_1 < 1 - \frac{n}{N}$ | $0 < \delta_1 < \frac{1}{N}$ | $0 < \delta_1 < \frac{2}{N}$ | $0 < \delta_1 < \frac{3}{N}$ | ... | $0 < \delta_1 < 1 - \frac{3}{N}$ | $0 < \delta_1 < 1 - \frac{2}{N}$ | $0 < \delta_1 < 1 - \frac{1}{N}$ |
|  | $0 < \delta_2 < \frac{n}{N}$ | $0 < \delta_2 < 1 - \frac{1}{N}$ | $0 < \delta_2 < 1 - \frac{2}{N}$ | $0 < \delta_2 < 1 - \frac{3}{N}$ | ... | $0 < \delta_2 < \frac{3}{N}$ | $0 < \delta_2 < \frac{2}{N}$ | $0 < \delta_2 < \frac{1}{N}$ |

Figure 12:
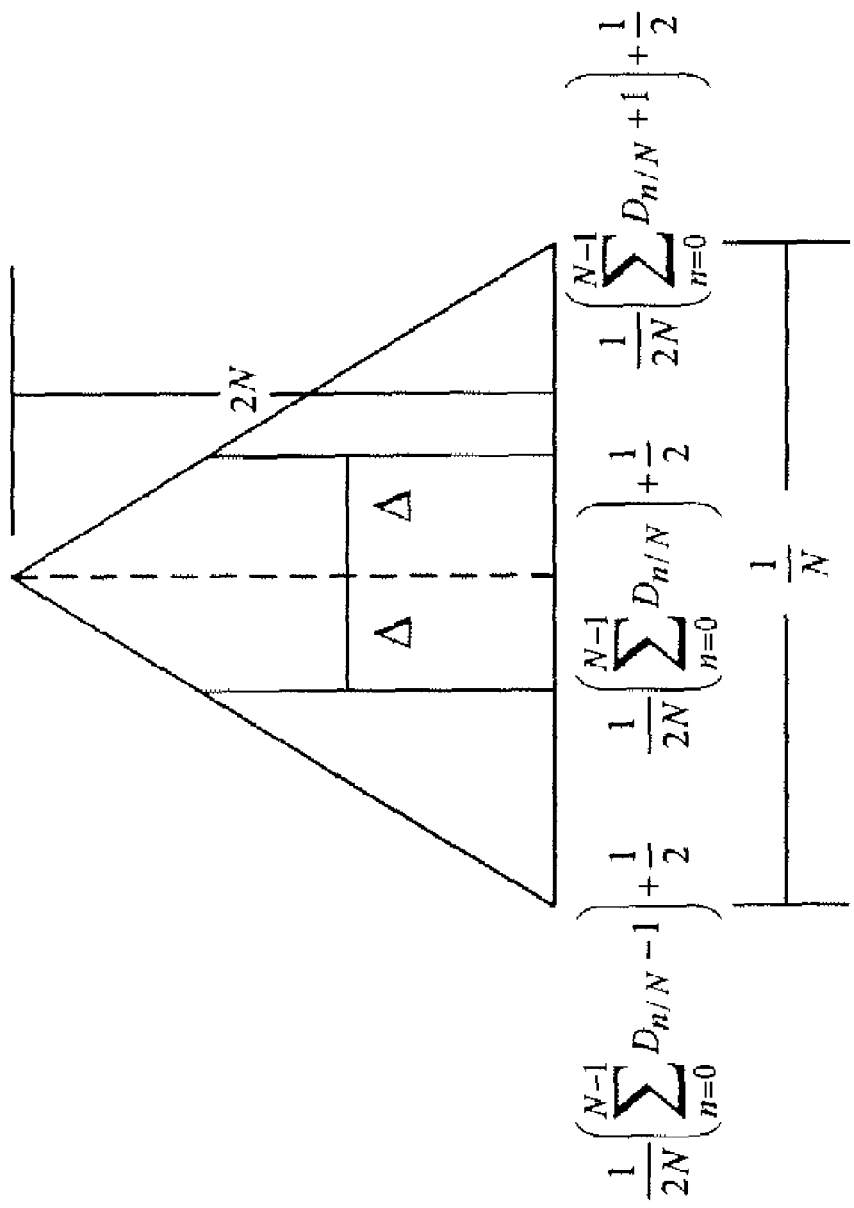
FIG. 12 is a diagram illustrating a probability density function of $$\frac{\delta_1+\delta_2}{2}$$

Table 4 illustrates all such sequences with their valid domain of $\delta_1 + \delta_2$, and $(\delta_1 + \delta_2)/2$. Because $\delta_1$ and $\delta_2$ are independent, for a given valid sequence, the probability density function of $(\delta_1 + \delta_2)/2$ is triangular as shown in FIG. 12. Therefore, using n/N, n=0, ..., N−1 clock-offset measurements, the refined estimate of the time of flight (in cycles) is given by $$(\check{t}_{OF})_N \cdot f_0 = \hat{t}_{OF} \cdot f_0 - \left( \frac{1}{2N} \left( \sum_{n=0}^{N-1} D_{n/N} \right) + \frac{1}{2} \right), \quad (28)$$

where $\hat{t}_{OF}$ is the coarse estimate of time of flight (in cycles) as obtained in (7) without any clock-offset measurements. This can be written in the more general case as $$(\check{t}_{OF})_N \cdot f_0 = \beta \cdot \left[ \hat{t}_{OF} \cdot f_0 - \alpha \cdot \left( \frac{1}{2N} \left( \sum_{n=0}^{N-1} D_{n/N} \right) + \frac{1}{2} \right) + c \right]$$

where $\alpha$, $\beta$, and c are constants, noting that in equation (28) $\alpha=1$, $\beta=1$ and c=0.

Accordingly, the confidence interval in (7) around $(\check{t}_{OF})_N \cdot f_0$ for confidence level $\gamma$ is given by $$P\left( \begin{array}{c} \check{t}_{OF} \cdot f_0 - \Delta \le t_{OF} \cdot \\ f_0 \le \check{t}_{OF} \cdot f_0 + \Delta \end{array} \right) = \gamma \Rightarrow 4N^2\Delta^2 - 4N\Delta + \gamma \quad (29)$$
$$= 0 \Rightarrow \Delta$$
$$= \frac{1 \pm \sqrt{1-\gamma}}{2N}, \; 0 \le \Delta \le \frac{1}{2N}.$$

Therefore, it is apparent from equation (29) that as N increases, n/N, n= ..., N−1 clock period clock-offset measurements are able to decrease the confidence interval $\Delta$ by N times for the same level of confidence. That is, the uncertainty of the estimate is reduced by N times, which is roughly equivalent to increasing the sampling clock frequency by a factor of N.

TABLE 4

Different valid realization of the observed sequence of $D_{(N-1)/N} D_{(N-2)/N} \ldots D_{2/N} D_{1/N}$ with corresponding domain of $\delta_1$ and $\delta_2$, $(\delta_1 + \delta_2)/2$ and $\check{t}_{OF} \cdot f_0$. Note that table 4 is divided into two sections to fit on the page: Section one comprising columns 1-6 and section two comprising columns 7 and 8. Table 4 should be read as if section two (columns 7 and 8) were reproduced along side section one.

| (1) $D_{(N-1)/N}$ | (2) $D_{(N-2)/N}$ | (3) $D_{(N-3)/N}$ | ... | (4) $D_{3/N}$ | (5) $D_{2/N}$ | (6) $D_{1/N}$ |
|---|---|---|---|---|---|---|
| 1 | 1 | 1 | ... | 1 | 1 | 1 |
| 1 | 1 | 1 | ... | 1 | 1 | 0 |
| 0 | 1 | 1 | ... | 1 | 1 | 1 |
| 1 | 1 | 1 | ... | 1 | 0 | 0 |
| 0 | 1 | 1 | ... | 1 | 1 | 0 |
| 0 | 0 | 1 | ... | 1 | 1 | 1 |
| . | . | . | ... | . | . | . |
| . | . | . | ... | . | . | . |
| 0 | 0 | 0 | ... | 0 | 0 | 0 |
| . | . | . | ... | . | . | . |
| . | . | . | ... | . | . | . |
| 0 | 0 | -1 | ... | -1 | -1 | -1 |
| 0 | -1 | -1 | ... | -1 | -1 | 0 |
| -1 | -1 | -1 | ... | -1 | 0 | 0 |
| 0 | -1 | -1 | ... | -1 | -1 | -1 |
| -1 | -1 | -1 | ... | -1 | -1 | 0 |
| -1 | -1 | -1 | -1 | -1 | -1 | -1 |

TABLE 4-continued

Different valid realization of the observed sequence of $D_{(N-1)/N}D_{(N-2)/N} \ldots D_{2/N}D_{1/N}$ with corresponding domain of $\delta_1$ and $\delta_2$, $(\delta_1 + \delta_2)/2$ and $\check{t}_{OF} \cdot f_0$. Note that table 4 is divided into two sections to fit on the page: Section one comprising columns 1-6 and section two comprising columns 7 and 8. Table 4 should be read as if section two (columns 7 and 8) were reproduced along side section one.

| (7) Sequence-specific valid domain of $\delta_1$ and $\delta_2$ | (8) Domain of $(\delta_1 + \delta_2)/2$ and $\check{t}_{OF}$ |
|---|---|
| $1 - \dfrac{1}{N} \leq \delta_1, < 1$ | $\dfrac{2N - 2}{2N} \leq \dfrac{\delta_1 + \delta_2}{2} < \dfrac{2N}{2N}$ |
| $1 - \dfrac{1}{N} \leq \delta_2, < 1$ | $\check{t}_{OF} \cdot f_0 = \hat{t}_{OF} \cdot f_0 - \dfrac{2N - 1}{2N}$ |
| $1 - \dfrac{2}{N} \leq \delta_1 < 1 - \dfrac{1}{N}$ | $\dfrac{2N - 3}{2N} \leq \dfrac{\delta_1 + \delta_2}{2} < \dfrac{2N - 1}{2N}$ |
| $1 - \dfrac{1}{N} \leq \delta_2 < 1$ | $\check{t}_{OF} \cdot f_0 = \hat{t}_{OF} \cdot f_0 - \dfrac{2N - 2}{2N}$ |
| $1 - \dfrac{1}{N} \leq \delta_1 < 1$ | $\dfrac{2N - 3}{2N} \leq \dfrac{\delta_1 + \delta_2}{2} < \dfrac{2N - 1}{2N}$ |
| $1 - \dfrac{2}{N} \leq \delta_2 < 1 - \dfrac{1}{N}$ | $\check{t}_{OF} \cdot f_0 = \hat{t}_{OF} \cdot f_0 - \dfrac{2N - 2}{2N}$ |
| $1 - \dfrac{3}{N} \leq \delta_1 < 1 - \dfrac{2}{N}$ | $\dfrac{2N - 4}{2N} \leq \dfrac{\delta_1 + \delta_2}{2} < \dfrac{2N - 2}{2N}$ |
| $1 - \dfrac{1}{N} \leq \delta_2 < 1$ | $\check{t}_{OF} \cdot f_0 = \hat{t}_{OF} \cdot f_0 - \dfrac{2N - 3}{2N}$ |
| $1 - \dfrac{2}{N} \leq \delta_1 < 1 - \dfrac{1}{N}$ | $\dfrac{2N - 4}{2N} \leq \dfrac{\delta_1 + \delta_2}{2} < \dfrac{2N - 2}{2N}$ |
| $1 - \dfrac{2}{N} \leq \delta_2 < 1 - \dfrac{1}{N}$ | $\check{t}_{OF} \cdot f_0 = \hat{t}_{OF} \cdot f_0 - \dfrac{2N - 3}{2N}$ |
| $1 - \dfrac{1}{N} \leq \delta_1 < 1$ | $\dfrac{2N - 4}{2N} \leq \dfrac{\delta_1 + \delta_2}{2} < \dfrac{2N - 2}{2N}$ |
| $1 - \dfrac{3}{N} \leq \delta_2 < 1 - \dfrac{2}{N}$ | $\check{t}_{OF} \cdot f_0 = \hat{t}_{OF} \cdot f_0 - \dfrac{2N - 3}{2N}$ |
| $\vdots$ | $\vdots$ |
| $\begin{cases} 1 - \dfrac{1}{N} \leq \delta_1 < 1 \\ 0 \leq \delta_2 < \dfrac{1}{N} \end{cases}$, or $\begin{cases} 1 - \dfrac{2}{N} \leq \delta_1 < 1 - \dfrac{1}{N} \\ \dfrac{1}{N} \leq \delta_2 < \dfrac{2}{N} \end{cases}$ or $\vdots$ | $\dfrac{N - 1}{2N} \leq \dfrac{\delta_1 + \delta_2}{2} < \dfrac{N + 1}{2N}$ |
| $\begin{cases} \dfrac{1}{N} \leq \delta_1 < \dfrac{2}{N} \\ 1 - \dfrac{2}{N} \leq \delta_2 < 1 - \dfrac{1}{N} \end{cases}$, or, $\begin{cases} 0 \leq \delta_1 < \dfrac{1}{N} \\ 1 - \dfrac{1}{N} \leq \delta_2 < 1 \end{cases}$ | $\check{t}_{OF} \cdot f_0 = \hat{t}_{OF} \cdot f_0 - \dfrac{1}{2}$ |
| $\vdots$ | $\vdots$ |
| $\dfrac{2}{N} \leq \delta_1 < \dfrac{3}{N}, 0 \leq \delta_2 < \dfrac{1}{N}$ | $\dfrac{2}{2N} \leq \dfrac{\delta_1 + \delta_2}{2} < \dfrac{4}{2N}, \check{t}_{OF} \cdot f_0 = \hat{t}_{OF} \cdot f_0 - \dfrac{3}{2N}$ |
| $\dfrac{1}{N} \leq \delta_1 < \dfrac{2}{N}, \dfrac{1}{N} \leq \delta_2 < \dfrac{2}{N}$ | $\dfrac{2}{2N} \leq \dfrac{\delta_1 + \delta_2}{2} < \dfrac{4}{2N}, \check{t}_{OF} \cdot f_0 = \hat{t}_{OF} \cdot f_0 - \dfrac{3}{2N}$ |

TABLE 4-continued

Different valid realization of the observed sequence of $D_{(N-1)/N}D_{(N-2)/N} \ldots D_{2/N}D_{1/N}$ with corresponding domain of $\delta_1$ and $\delta_2$, $(\delta_1 + \delta_2)/2$ and $\check{t}_{OF} \cdot f_0$. Note that table 4 is divided into two sections to fit on the page: Section one comprising columns 1-6 and section two comprising columns 7 and 8. Table 4 should be read as if section two (columns 7 and 8) were reproduced along side section one.

| | |
|---|---|
| $0 \leq \delta_1 < \frac{1}{N}, \frac{2}{N} \leq \delta_2 < \frac{3}{N}$ | $\frac{2}{2N} \leq \frac{\delta_1 + \delta_2}{2} < \frac{4}{2N}, \check{t}_{OF} \cdot f_0 = \hat{t}_{OF} \cdot f_0 - \frac{3}{2N}$ |
| $\frac{1}{N} \leq \delta_1 < \frac{2}{N}, 0 \leq \delta_2 < \frac{1}{N}$ | $\frac{1}{2N} \leq \frac{\delta_1 + \delta_2}{2} < \frac{3}{2N}, \check{t}_{OF} \cdot f_0 = \hat{t}_{OF} \cdot f_0 - \frac{2}{2N}$ |
| $0 < \delta_1 < \frac{1}{N}, \frac{1}{N} \leq \delta_2 < \frac{2}{N}$ | $\frac{1}{2N} \leq \frac{\delta_1 + \delta_2}{2} < \frac{3}{2N}, \check{t}_{OF} \cdot f_0 = \hat{t}_{OF} \cdot f_0 - \frac{2}{2N}$ |
| $0 < \delta_1 < \frac{1}{N}, 0 < \delta_2 < \frac{1}{N}$ | $0 < \frac{\delta_1 + \delta_2}{2} < \frac{2}{2N}, \check{t}_{OF} \cdot f_0 = \hat{t}_{OF} \cdot f_0 - \frac{1}{2N}$ |

The confidence interval with n/N offset measurements is shown in Table 5, which illustrates the reduction of the confidence interval by factor of N for given level of confidence. In the embodiments illustrated in table 5, N=1 represents the case where no additional time-offset measurements are made. The block diagram for the half-clock-period offset shown in FIG. 11 is modified as shown in FIG. 13 for n/N-clock-period offset measurements.

The fundamental results can be summarized in the following theorem.

Theorem-1: When the error due to finite clock resolution in two-way ranging is modeled as $\delta_1 \in U(0,1)$ and $\delta_2 \in U(0,1)$ as in (5) and (6), respectively, the coarse estimate of time of flight (in clock cycles with $f_0$ as sampling clock frequency) is given by $\hat{t}_{OF} \cdot f_0 = t_{OF} \cdot f_0 + (\delta_1 + \delta_2)/2$, and the estimate of time of flight with n/N, n=0, . . . , N−1 clock-period offset introduced in the device that initiates the ranging measurement is given by $(\hat{t}_{OF})_{n/N} \cdot f_0 = t_{OF} \cdot f_0 + ((\delta_1)_{n/N} + (\delta_2)_{n/N})/2$. The case of n=0 refers to the initial measurement without additional clock phase offset as given in equation (7). The fine estimate of time of flight is given by $$(\check{t}_{OF})_N \cdot f_0 = \hat{t}_{OF} \cdot f_0 - \left(\sum_{n=0}^{N-1} D_{n/N} + N\right)/2N,$$

where $D_{n/N} = 2(\hat{t}_{OF} - (\hat{t}_{OF})_{n/N}) \cdot f_0$ with n=0, $D_{n/N}=0$ and confidence interval $\Delta = (1 \pm \sqrt{1-\gamma})/2N$, $0 \leq \Delta \leq \frac{1}{2}N$.

TABLE 5

Confidence interval $\Delta$ of $\check{t}_{OF} \cdot f_0$ for different level of confidence

| Probability $\gamma$ | Confidence Interval $\pm \Delta$ (in clock-period or cycle) | Confidence Interval $\Delta_d = \pm \Delta \cdot \frac{c}{f_0}$ (in cm) $c = 3 \times 10^{10}$ cm/sec, $f_0 = 528 \times 10^6$ cycle/sec |
|---|---|---|
| 1 | 0.5/N | 28.4/N |
| 0.99 | 0.45/N | 25.56/N |
| 0.9 | 0.34/N | 19.31/N |
| 0.8 | 0.28/N | 15.9/N |

FIG. 13 is a diagram illustrating a high level view of multiple ranging measurements with n/N clock-period offset measurements in accordance with one embodiment of the invention. The operation illustrated in FIG. 13 is similar to that shown in FIG. 11, with a distinction being that FIG. 13 illustrates the general case of n/N including the no-offset case with n=0 and N=1, where FIG. 11 illustrates the specific case where N=2. As shown in FIG. 13, measurement set 1 1302 consists of only the first measurement of time of flight without any additional offset, whereas, measurement set 2 1304 contains all the measurements with offsets n/N, with 0, 1, . . . , N−1, where n=0 corresponds to no additional offset.

The above discussion described measurements under the assumption that there was no clock drift between the devices 102, 104. Now described are scenarios where clock drift is introduced into the ranging process.

Before presenting the analysis that captures the effect of clock drift on ranging in the presence of finite clock resolution, the potential sources of clock drift are briefly reviewed. Time scale in the clocks is defined by the period of basic oscillation of the frequency-determining element, for example, the crystal in the case of a quartz clock, and the oscillation of atoms in the case of an atomic clock. Thus, a clock can be viewed as a numerical integrator of a periodic signal produced by an oscillator, and in one embodiment the timekeeping function is implemented by simply counting cycles.

The Frequency of such an oscillator is subject to variation due to a number of factors such as, for example, temperature variations and aging. The instantaneous frequency of the oscillator at actual time t, $f_i(t)$, is given by $$f_i(t) = f_0 + \Delta f + D_f(t - t_0) + \epsilon(t), \quad (30)$$

where $f_0$ is the nominal oscillator frequency, $\Delta f$ is the frequency bias, $D_f$ is the frequency drift in Hz/sec, $t_0$ is the reference epoch, and $\epsilon(t)$ stands for nonsystematic, unmodeled random frequency errors. For ease of discussion, the frequency drift is assumed to be constant with time. Therefore, total number of clock cycles at time t is given by $$N(t) = \int_{t_0}^{t} f_i(t) dt,$$

and accordingly, observed clock timing $t_i(t)$ at time t is $$t_i(t) - t_{0i} = \frac{1}{f_0} N(t) \qquad (31)$$

$$= \frac{1}{f_0} \int_{t_0}^{t} f_i(t) dt$$

$$= t - t_0 + \frac{\Delta f(t - t_0)}{f_0} + \frac{D_f(t - t_0)^2}{2f_0} + \frac{1}{f_0} \int_{t_0}^{t} \varepsilon(t) dt,$$

where $t_{0i}$ is the clock timing at the reference epoch $t_0$.

FIG. 14 is a diagram illustrating an example case of instantaneous frequency $f_i(t)$ and clock timing $t_i(t)$. Referring now to FIG. 14, the dotted lines represent the parts of frequency $f_i(t)$ as determined in equation (30) and the solid lines represent clock timing $t_i(t)$ as determined in equation (31).

For the remainder of this analysis, assume that the $D_f=0$ and $\varepsilon(t)=0$, and thus using equation (31), the clock-inaccuracy in time can be expressed as:

$$t_i(t) - t = (t_{0i} - t_0) + \rho(t - t_0), \rho = \frac{\Delta f}{f_0}.$$

Therefore, the clock inaccuracy in time is due to clock offset $t_{0i}-t_0$ (equivalent to $\delta_1$ and $\delta_2$ inaccuracy in ranging) at the starting epoch and clock drift, which is quantified by $\rho(t-t_0)$. Further, the clock drift is caused due to the presence of clock-frequency offset $\Delta f$.

In the previous section, the effect on ranging of a finite clock resolution that causes time-offset $\delta_1$ and $\delta_2$ was described. The following discussion provides an analysis that considers both the effects of finite clock resolution and clock-frequency offset upon ranging. Let n be the total number of cycles counted in device 102 during the measurements between $R_1$ and $T_1$, i.e., $n=R_1-T_1$. Similarly $m=T_2-R_2=T_{DEV}$ represents the number of clock cycles elapsed in device 104. Further, let $f_0+\Delta f_1$ and $f_0+\Delta f_2$ represent the frequency of the clocks in device 102 and device 104 respectively, where $f_0$ is nominal frequency of the clocks and $\Delta f_1$ and $\Delta f_2$ are the frequency offset of the clocks in device 102 and device 104, respectively. Therefore, $t_{OF}$ in seconds can be expressed as $$t_{OF} = \frac{1}{2}\left(\frac{n}{f_0 + \Delta f_1} - \frac{\delta_1}{f_0 + \Delta f_1}\right) - \frac{1}{2}\left(\frac{m}{f_0 + \Delta f_2} + \frac{\delta_1}{f_0 + \Delta f_2}\right) \qquad (32)$$

$$= \frac{n - \delta_1}{2f_0}\left(1 + \frac{\Delta f_1}{f_0}\right)^{-1} - \frac{m + \delta_2}{2f_0}\left(1 + \frac{\Delta f_2}{f_0}\right)^{-1}$$

$$\approx \frac{n - \delta_1}{2f_0}\left(1 - \frac{\Delta f_1}{f_0}\right) - \frac{m + \delta_2}{2f_0}\left(1 - \frac{\Delta f_2}{f_0}\right)$$

$$t_{OF} = \frac{1}{2f_0}(n - m) - \frac{1}{2f_0}(\delta_1 + \delta_2) - \frac{1}{2f_0^2} \qquad (33)$$

$$((n - \delta_1)\Delta f_1 - (m + \delta_2)\Delta f_2)$$

$$= \hat{t}_{OF} - \frac{1}{2f_0}(\delta_1 + \delta_2) - \frac{1}{2f_0^2}((n - \delta_1)\Delta f_1 - (m + \delta_2)\Delta f_2).$$

In equation (32), since $\Delta f_1 \ll f_0$ and $\Delta f_2 \ll f_0$ the Taylor's series is truncated, ignoring the higher order terms.

In one embodiment, consider, $\Delta \delta_1 \ll n$, and $\Delta \delta_2 \ll m$, and $n/f_0 \approx m/f_0$. Also consider one embodiment for the use of an ultrawide-band device in a Wireless Personal Area Network (WPAN) where the distance is within 10 m resulting in $t_{OF} \leq 33.33$ nsec. Therefore, since where n is greater than m by $2t_{OF}$ and $t_{of}$ is very small, equation (33) can be further simplified as:

$$t_{OF} \approx \hat{t}_{OF} - \frac{1}{2f_0}(\delta_1 + \delta_2) - \frac{1}{2f_0^2}(n\Delta f_1 - m\Delta f_2), \qquad (34)$$

$$\approx \hat{t}_{OF} - \frac{1}{2f_0}(\delta_1 + \delta_2) - \frac{n}{2f_0^2}(\Delta f_1 - \Delta f_2). \qquad (35)$$

Therefore, to get rid of the inaccuracy due to clock drift, in one embodiment, both $\Delta f_1$ and $\Delta f_2$, in other words, the clock drift of both of the clocks in device 102 and device 104, is used. However, to estimate $\Delta f_1$ and $\Delta f_2$ separately is not always possible due to unavailability of exact time elapsed during the measurements. Therefore, a method of estimating the quantity $\Delta f_1 - \Delta f_2$ is now described. This technique allows removal or at least diminishing of the inaccuracy due to clock-frequency offset.

FIG. 15 is a diagram illustrating three sets of ranging measurements that can be used to estimate the clock-frequency offset in accordance with one embodiment of the invention. Referring now to FIG. 15, in one embodiment, the clock drift between two clocks is determined from multiple clock measurements. Preferably, where there is the presence of noise and finite clock resolution, it is favorable to consider a higher number of ranging measurements. Three ranging measurements are illustrated in FIG. 15, although other quantities of measurements can be used.

Note that in the illustrated embodiment, all of the $K \geq 2$ sets of measurements, namely, $T_1(1), T_2(1), \ldots, T_1(K), T_2(K), R_1(1), R_2(1), \ldots, R_1(K)$ are in values of clock-cycles and can be maintained in counter registers associated with devices 102, 104 or elsewhere. Also in the described embodiment, the time of flight, $t_{OF}$, the clock offset between two devices v, and measurement inaccuracy due to finite clock resolution $\phi_1$ and $\phi_2$ are in seconds. Let n'(K) be the number of cycles elapsed in device 102 between the measurements of $T_1(K)$ and $T_1(1)$ and m'(K) is the number of cycles elapsed in device 104 between the measurements of $R_2(K)$ and $R_2(1)$.

Assuming the detection of the reference signal is perfect in both the devices, n(K) and m(K) can be related as:

$$\frac{n'(K)}{f_0 + \Delta f_1} + t_{OF} + \varphi_2(K) = \frac{m'(K)}{f_2 + \Delta f_2} + t_{OF} + \varphi_2(1) \qquad (36)$$

$$\Rightarrow \frac{n'(K)}{f_0 + \Delta f_1} + \frac{\delta_2(K)}{f_0 + \Delta f_2} = \frac{m'(K)}{f_0 + \Delta f_2} + \frac{\delta_2(1)}{f_0 + \Delta f_2}$$

$$\Rightarrow \frac{n'(K)}{m'(K) + \delta_2(1) - \delta_2(K)} = \frac{f_0 + \Delta f_1}{f_0 + \Delta f_2} \qquad (37)$$

$$\Rightarrow \Delta f_1 - \Delta f_2 = (f_0 + \Delta f_2) \cdot \left(\frac{n'(K) - m'(K) - (\delta_2(1) - \delta_2(K))}{m'(K) + \delta_2(1) - \delta_2(K)}\right)$$

$$\Rightarrow \Delta f \approx f_0 \cdot \left(\frac{n'(K) - m'(K) - (\delta_2(1) - \delta_2(K))}{m'(K)}\right)$$

$$\Rightarrow = f_0 \cdot \frac{n'(K) - m'(K)}{m'(K)} - f_0 \cdot \frac{(\delta_2(1) - \delta_2(K))}{m'(K)}$$

$$\Rightarrow = \Delta \hat{f}(K) - f_0 \cdot \frac{(\delta_2(1) - \delta_2(K))}{m'(K)}$$

$$\Rightarrow \Delta \hat{f}(K) \approx \Delta f + f_0 \cdot \frac{(\delta_2(1) - \delta_2(K))}{m'(K)},$$

where the estimate of the clock-frequency offset is given by $\Delta \hat{f}(K) = f_0(n'(K) - m'(K))/m'(K)$, and $\delta_2(1) = \phi_2(1) \cdot (f_0 + \Delta f_2)$ and $\delta_2(K) = \phi_2(N) \cdot (f_0 + \Delta f_2)$ are inaccuracies in the measurements of the arrival time at device 104 given by $R_2(1)$ and $R_2(K)$, respectively, due to finite clock resolution.

$\delta_2(1)$ and $\delta_2(K)$ are given by $$\delta_2(1) = \lceil \varepsilon - \eta \rceil - (\varepsilon - \eta), \quad (38)$$

and $$\begin{aligned}\delta_2(K) &= \lceil \varepsilon - \eta(K) \rceil - (\varepsilon - \eta(K)) \\ &= \lceil \varepsilon - \eta - \mathrm{mod}(\Delta f \cdot 2(K-1)T_1 \rceil - \\ &\quad (\varepsilon - \eta - \mathrm{mod}(\Delta f \cdot 2(K-1)T)_1) \\ &= \lceil \varepsilon - \eta - \Delta f \cdot 2(K-1)T \rceil - (\varepsilon - \eta - \Delta f \cdot 2(K-1)T)\end{aligned} \quad (39)$$

where $\eta(K) = \eta + \mathrm{mod}(\Delta f \cdot 2(K-1)T)_1$ is the clock-offset that occurs between two devices 102, 104 during the start of K sets of ranging measurements, namely, between $T_1(K)$ and $R_2(K)$, and $T = T_{RMpacket} + \mathrm{SIFS} + t_{OF}$ with $T_{RMpacket}$ denoting the duration of the RM (Ranging Measurement) packet, and SIFS denoting the short interframe spacing.

$T_{RMpacket}$, the duration of the RM (Ranging Measurement) packet is given in Table 6, and the short interframe spacing (SIFS) is 10 μsec according to the WiMedia standard. Note that $\delta_2(1) \sim U(0,1)$ and $\delta_2(K) \sim U(0,1)$, and thus assuming independence of $\delta_2(1)$ and $\delta_2(K)$ over the realization of $\varepsilon$, $\eta$ and K, the distribution of $\delta_2(1) - \delta_2(K)$ is triangular from −1 to 1 with a mean of zero. Therefore, using $m'(k) = 2(k-1)T \cdot (f_0 + \Delta f_2)$ in (37) and the sample mean of $\Delta \hat{t}(k)$ for $k = K_1, \ldots, K$ yields the following estimate $$\begin{aligned}\Delta \hat{f} &= \frac{1}{K - K_1} \sum_{k=K_1}^{K} \Delta \hat{f}(k) \\ &= \Delta f + \frac{1}{2T(K - K_1)} \sum_{k=K_1}^{K} \frac{\delta_2(1) - \delta_2(k)}{(k-1)},\end{aligned}$$

The fact that a system may have a finite clock resolution can have an effect on the estimate of the clock drift. Particularly, the sample-mean of the estimates of clock frequency offset reduce the bias in the estimate, and thus a higher value of K, the total number of packet transactions, may be desirable. Additionally, waiting a longer period of time before obtaining the estimate the clock frequency-offset can make the estimator less susceptible to the error due to finite clock resolution.

TABLE 6

RM frame-related parameter: standard frame, each OFDM symbol is 312.5 ns duration

| Parameter | Description | Value |
|---|---|---|
| $N_{pf}$ | Number of symbols in the packet/frame synchronization sequence | 24 |
| $T_{pf}$ | Duration of the packet/frame synchronization sequence | $24 \times 312.5 \times 10^{-9} = 7.5$ μs |
| $N_{ce}$ | Number of symbols in the channel estimation sequence | 6 |
| $T_{ce}$ | Duration of the channel estimation sequence | $6 \times 312.5 \times 10^{-9} = 1.875$ μs |
| $N_{hdr}$ | Number of symbols in the PLCP Header | 12 |
| $T_{hdr}$ | Duration of the PLCP Header | $12 \times 312.5 \times 10^{-9} = 3.75$ μs |
| $N_{RMframe}$ | Number of symbols in RM frame | $6 \times \left\lceil \frac{8+38}{N_{IBP6S}} \right\rceil = 6$ |

TABLE 6-continued

RM frame-related parameter: standard frame, each OFDM symbol is 312.5 ns duration

| Parameter | Description | Value |
|---|---|---|
| $T_{RMframe}$ | Duration for the PSDU | $6 \times 312.5 \times 10^{-9} = 1.875$ μs |
| $N_{RMpacket}$ | Total number of symbols in the packet | $N_{pf} + N_{ce} + N_{hdr} + N_{RMframe} = 48$ |
| $T_{RMpacket}$ | Duration of the RM packet | $48 \times 312.5 \times 10^{-9} = 15$ μs | where $N_{IBP6S}$ is the number of info bits per 6 OFDM symbol.

Note that as k goes bigger the error term in the estimate gets smaller and we should consider higher value for $K_1$ and K for better estimate. The estimate of $\Delta f$ can be used appropriately to get rid of the effect of clock-frequency offset from the ranging estimate.

To apply the time-offset measurements with n/N, n = 0, 1, . . . , N−1 offset for ranging in the presence of clock drift or clock frequency offset, the bias due to clock frequency offset may first be removed (or compensated) from the measurements and the applied time-offset in the first device 102 can be such that when it is added to the time-offset, created due to the presence of clock-frequency offset during the start of the previous measurement to the start of the present measurement, the total relative time-offset becomes n/N, n = 1, . . . , N−1.

In the previous analysis the presence of clock-frequency offset between two devices 102, 104 was considered, its effect on the estimation of time of flight described. Now described are other related implementation and practical issues that can impact the estimation accuracy of the time of flight in various embodiments or applications of the invention.

In ranging algorithms according to the present invention, there are multiple techniques that can be used to implement time-offset in the additional measurements, as would be apparent to one of ordinary skill in the art after reading this disclosure. In one embodiment, control logic can be implemented to provide a different measurement interval for detecting transmission and reception of the signals. This can be done, for example, by shifting the clock phase over time, determining a new sampling time based on the existing clock signal, and other like techniques. Such control logic can be implemented using hardware, software, or a combination thereof. For example, one or more processors, ASICs, PLAs, and other logic devices or components can be included with the device to implement the desired features and functionality. As another example, in one embodiment, a hardware switch or like componentry can be implemented to enable shifting the sampling clock pulse by a predetermined amount and thus create a relative time offset between consecutive sampling instances of devices 102, 104. In yet another embodiment of the invention, the use of a different clock edge for sampling can provide the desired offset. For example, sampling the data on the rising edge instead of the falling edge, or vice versa, can create a time offset between the sampling instants of multiple measurements between two devices 102, 104. In still a further embodiment, the normally occurring clock drift can provide a source of offset over a given period of time.

For example, with $\rho = \Delta f / f_0$ (in ppm) clock-frequency offset, and nominal frequency, $f_0$, x number of clock cycles required to obtain an n/N, n = 1, . . . , N−1 clock-period time-offset is given by $$\mod(\rho \cdot x)_1 = \frac{n}{N} \quad (40)$$

where $\mod(\bullet)_1$ denotes modulo 1 operation. Furthermore, if we constrain the number of clock cycles to be elapsed as multiple of clock cycles in one set of two-way ranging measurement, then, (40) can rewritten as $$\mod(2T \cdot f_0 \cdot \rho \cdot x)_1 = \frac{n}{N} \quad (41)$$

with $T = T_{RMpacket} + SIFS + t_{OF}$ where x is required set of ranging.

Equations (40) and (41) can be solved numerically for integer value of x. For example, for a $\rho$=40 ppm, $f_0$=528 MHz, T≈25 μsec and a ½ clock-period offset (n=1, N=2), x=12500 cycles according to (40) and x≈9 sets of ranging measurements according to (41). Likewise, for ⅓ and ⅔ (N=3, n=1, 2) offset x≈6 and 12 sets of ranging measurements, respectively. Therefore, in one embodiment, device 102 completes x sets of ranging transactions to compensation of clock-period offset. In one embodiment, multiple ranging measurements with the compensation of clock drift that makes the time-offset between different measurements the same can be used to refine the time of flight estimate by averaging.

In applications where noise is a factor, a packet 112, 114, or other signal used for ranging, may be lost. In one embodiment, if a packet 112, 114 or signal is lost within a particular set of measurements, that loss can be detected and the measurement set removed from the computations so that ranging can be performed more accurately.

Likewise, in some applications the timing of the detection of the packet 112, 114 or signal may be affected, creating a jitter or other uncertainty in the time of arrival. In one embodiment the impact of jitter or timing uncertainties due to noise or other factors can be reduced by averaging the results over multiple measurements.

In some applications, especially in the wireless arenas, the presence of multipath may affect the accuracy of ranging measurements. In the presence of a line of sight (LOS) transmission path, the first packet 112, 114 to be received would give the right measure of the time of arrival. Thus, in one embodiment, where multiple receive measurements are made, the first in time to occur is the measurement used for ranging purposes. In another embodiment, the highest signal strength measurement is used. In other embodiments, any one or more (including all) of the multiple signals received can be used. For example, consider an application of ultra-wideband systems employed in WPAN. In this application, due to high number of resolvable multipath and less user mobility there is typically less fading than some other applications. Thus, in this environment, it is very likely that the first path in the presence of LOS would have higher strength than the other paths. As such, the time of arrival estimation based on the maximum value of correlation yields the correct range estimate. However, in the absence of a LOS, the range estimate in one embodiment simply becomes an upper bound estimation of the true distance.

The arrival of a packet at a receiver can detected by using correlation between the received sequence and a pilot sequence stored in the receiver. Due to the asynchronous nature of the ranging transaction, there is typically a fractional clock-period offset between the sampling instants of the transmitter and the receiver, as described above. In addition, the length of the time of flight can approach a fractional (non-integer) multiple of the clock period, making the correlation result imperfect. Therefore, the peak of the correlation may occur at the next or previous immediate sampling instant of the actual arrival time of the packet. In one embodiment, it can be assumed that the packet is detected at the next immediate sampling instant that results in the mean value of the clock-uncertainty in the estimate as a half clock period. However, use of correlation in the practical case makes the mean value of the error in the estimate to be zero. Thus, considering the effect of correlation in finding the arrival time, the refined estimate of time of flight given by equation (28) can be modified as $$(\breve{t}_{OF})_N \cdot f_0 = \hat{t}_{OF} \cdot f_0 - \frac{1}{2N}\left(\sum_{n=0}^{N-1} D_{n/N}\right). \quad (42)$$

Because there is a time gap between the generation and the actual transmission of the reference signal on the transmit side (and a similar latency between the actual arrival and the detection of a packet on the receive side), in one embodiment the ranging measurements are calibrated accordingly. For example, in one embodiment the measurements in device 102 can be calibrated as $$T_{1c} = T_1 + (TTD)_{DEV1}$$

$$R_{1c} = R_1 - (RTD)_{DEV1} \quad (43)$$

where $(TTD)_{DEV1}$ is the transmit-time-delay between the generation of the reference signal and the transmission time from the antenna of device 102, $(RTD)_{DEV1}$ is the receive-time-delay between the arrival of the reference signal at the antenna of device 102 and the time it is detected at by the receiver, and $T_{1c}$ and $R_{1c}$ are calibrated transmission time and receive time of the packet, respectively, those are used as the ranging measurements. Similarly, device 104 will yield $$T_{2c} = T_2 + (TTD)_{DEV2}$$

$$R_{2c} = R_2 - (RTD)_{DEV2} \quad (44)$$

Using the calibrated measurements in (42) and (44), the estimate of time of flight is now given by $$\hat{t}_{OF} \cdot f_0 = \frac{(R_{1c} - T_{1c}) - (T_{2c} - R_{2c})}{2}. \quad (45)$$

In another embodiment, devices 102, 104 may have different sampling frequencies. In this case, the distribution of the uncertainty due to finite resolution of the clock will no longer be triangular. Suppose devices 102, 104 operate on $f_1 + \Delta f_1$ and $f_2 + \Delta f_2$ respectively, where $f_1$ and $f_2$ are the nominal frequencies with $l = f_1/f_2$. It can be shown that $$t_{OF} \approx \hat{t}_{OF} - \left(\frac{\delta_1}{2f_1} + \frac{\delta_2}{2f_2}\right) - \frac{1}{2f_2^2}\left(\frac{n\Delta f_1 - ml^2 \Delta f_2}{l^2}\right). \quad (46)$$

Note that with $f_1 = f_2 = f_0$ and $l=1$, equation (46) becomes (34). Assuming that the effect of frequency offset is compensated, equation (46) can be written as $$\check{t}_{OF} \cdot f_1 \approx t_{OF} \cdot f_1 - \frac{1}{2}(\delta_1 + l\delta_2). \qquad (47)$$

Thus, comparing equation (47) with equation (7) it is evident that the uncertainty is now changed from $(\delta_1+\delta_2)/2$ to $(\delta_1+\delta_2)/2$. Accordingly the distribution of uncertainty is changed and now its domain is from zero to $(l+1)/2$. Therefore, for $l>1$, the estimate will have higher uncertainty than before. Considering the new distribution of the uncertainty, appropriate bias can be determined based on the differences of estimates (obtained using clock-offset) from the prior estimate (without any additional clock-offset).

The inventors conducted simulations with one or more embodiments of the invention to illustrate the effectiveness of the results and the increased accuracy in ranging via time-offset measurements. Results of these simulations are now described. Without loss of generality, consider that $(t_{OF})_{int} \cdot f_0 = 1$. $\epsilon = t_{OF} \cdot f_0 - (t_{OF})_{int} \cdot f_0$ and time-offset $\eta$ are generated from uniform random distribution from 0 to 1. $f_0$, the sampling clock frequency of the clock, is considered to be 528 MHz. This is the minimum clock frequency of ranging implementation of UWB systems proposed by the WiMedia-MBOA.

Ranging estimator $\check{d}$ (in cm) is obtained as $\check{d}_N = (\check{t}_{OF})_N \cdot c$ and the MSE of the ranging estimator $$MSE(N) = E\left[\left(\check{d}_N - d\right)^2\right]$$

is obtained from the average over 10000 simulation runs. The results of these are plotted in FIG. 17 as a function of N. FIG. 17 is a diagram illustrating simulation results for a performance comparison of ranging from N=1 to 10, where N=1 is a conventional technique, and using $N \cdot f_0$ sampling clock frequency. As illustrated in FIG. 17, the time-offset ranging measurements yield superior performance to conventional measurement techniques. Further, with higher N and n/N, $(n=1, \ldots, N-1)$ the MSE is reduced, and thus performance improves. FIG. 17 also illustrates that performance of the ranging estimator is the same with $N^* f_0$ clock-frequency and with n/N, n=1, ..., N−1 time-offset measurements. Thus, use of n/N, n=1, ..., N−1 time-offset measurements is equivalent to the use of $N \cdot f_0$ sampling clock-frequency. Therefore, when it is not viable to use higher sampling clock frequency in the device, we can achieve superior ranging performance using n/N, n=1, ..., N−1 clock-offset measurement which is equivalent to using $N \cdot f_0$ sampling clock-frequency.

TABLE 7

Analytical vs. Simulation Results on Confidence Interval

| Confidence Level $\gamma$ | Analytical vs. Simulated Confidence Interval (in cycle) | N = 1 | N = 2 | N = 3 | N = 4 | N = 5 | N = 6 | N = 7 | N = 8 | N = 9 | N = 10 |
|---|---|---|---|---|---|---|---|---|---|---|---|
| 0.99 | analytical | 0.45 | 0.225 | 0.15 | 0.112 | 0.09 | 0.075 | 0.064 | 0.056 | 0.05 | 0.045 |
|  | simulation | 0.451 | 0.226 | 0.15 | 0.113 | 0.09 | 0.074 | 0.064 | 0.056 | 0.05 | 0.045 |
| 0.8 | analytical | 0.28 | 0.14 | 0.093 | 0.07 | 0.056 | 0.046 | 0.04 | 0.035 | 0.0311 | 0.028 |
|  | simulation | 0.275 | 0.138 | 0.093 | 0.07 | 0.055 | 0.045 | 0.039 | 0.034 | 0.030 | 0.027 |

For a given realization of $\epsilon$ and $\eta$, $\delta_1$ and $\delta_2$ can be calculated using equations (5) and (6), respectively. The coarse estimate of time-of-flight (in cycles) $\hat{t}_{OF} \cdot f_0$ is calculated using $\delta_1$ and $\delta_2$ in equation (7). $D_{n/N}$ is calculated according to equation (21) and a fine unbiased estimate of time of flight (in cycles) $(\check{t}_{OF})_N \cdot f_0$ is calculated according to equation (28) using calculated $\hat{t}_{OF}$ and $D_{n/N}$. The MSE (Mean Squared Error) of the unbiased estimator $$MSE(N) = E\left[\left(\left(\check{t}_{OF}\right)_N - t_{OF}\right) \cdot f_0\right)^2\right]$$

was obtained from the average of over 10,000 simulation runs and is shown in FIG. 16, where N=1 corresponds to the conventional case with no additional time-offset measurement. FIG. 16 illustrates a performance comparison of time of flight (in clock cycles) estimators using one embodiment of the present invention. From this simulation as illustrated in FIG. 16, it is evident that as N increases the performance of the ranging algorithm that uses additional N−1 time-offset measurements improves. Table 7 shows the confidence level $\gamma$ of the time of flight (in cycles) estimator obtained from analysis and simulation.

To show the effectiveness of the present invention, consider a case where $f_0$=528 MHz, with clock accuracy of device 102, $\rho_1$=20 ppm and device 104, $\rho_2$=15 ppm, and thus the actual frequency offset is $\Delta f = \Delta f_1 - \Delta f_2 = f_0(\rho_1 - \rho_2) = 2640$ Hz. Again, without loss of generality, consider the case of $(t_{OF})_{int}=1$. $\epsilon$ and $\eta$ are generated from uniform distribution over 0 to 1. m'(k) is calculated from m'(k)=2(k−1)T·$(f_0+\Delta f_2)$, where T=25 μsec+$t_{OF}$ (Table 6) and n(k) is calculated from equation (36) for a given realization of $\delta_2(1)$ (from equation (38), and $\delta_2(k)$ (from equation (39)). The estimate of the clock frequency-offset was obtained as $\Delta f(K) = f_0 \cdot (n'(K) - m'(K))/m'(K)$ and averaged over 10,000 simulations as shown in FIG. 18.

FIG. 18 is a plot illustrating the improvement of the accuracy of clock-frequency offset over the number of ranging measurement sets K in accordance with one embodiment of the invention. From FIG. 18, it can be seen that $\Delta f$ converges to the actual value of 2640 as the number of ranging measurement gets higher. Note that the detrimental effect of the finite clock resolution is very prominent at the lower values of K. This phenomenon can be explained from equation (37). $\delta_2(1) - \delta_2(K)$ is a pseudo-periodic function within −1 to 1 that causes oscillation in the estimator. However, m(K) increases linearly with K and thus, at lower values of K, the error term $(\delta_2(1) - \delta_2(K))/m(K)$ is higher and decays as K grows.

While various embodiments of the present invention have been described above, it should be understood that they have been presented by way of example only, and not of limitation. Thus the breadth and scope of the present invention should not be limited by any of the above-described exemplary embodiments. Additionally, the invention is described above in terms of various exemplary embodiments and implementations. It should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," and terms of similar meaning should not be construed as limiting the item described to a given time period or to an item available as of a given time, but instead should be read to encompass conventional, traditional, normal, or standard technologies that may be available now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

What is claimed is:

1. A method of determining a distance between first and second wireless communication devices, comprising the steps of:
   the first device sending a first signal to the second device over a wireless communication channel;
   the first device receiving a second signal from the second device in response to the second signal;
   determining a first number of clock cycles elapsed between sending the first signal and receiving the second signal;
   the first device sending a third signal to the second device over a wireless communication channel;
   the first device receiving a fourth signal from the second device in response to the third signal;
   determining a second number clock cycles elapsed between sending the third signal and receiving the fourth signal; and
   determining a refined time-of-flight estimate between the first and second devices as a function of the first and second numbers of clock cycles.

2. The method of claim 1, wherein the step of determining a refined time-of-flight estimate comprises determining a refined time-of-flight estimate between the first and second devices based on the difference between the first and second numbers of clock cycles.

3. The method of claim 2, wherein the refined time of flight estimate is computed as: the original time-of-flight estimate $c_1$ where the difference between the first and second numbers of clock cycles is one clock cycle; the original time-of-flight estimate $c_2$ where the difference between the first and second numbers of clock cycles is zero clock cycles; and the original time-of-flight estimate $c_3$ where the difference between the first and second numbers of clock cycles is negative one clock cycle, where $c_1$, $c_2$, and $c_3$, are constants.

4. The method of claim 2, wherein the refined time of flight estimate is computed as: the original time-of-flight estimate $-3/4$ where the difference between the first and second numbers of clock cycles is one clock cycle; the original time-of-flight estimate $-1/2$ where the difference between the first and second numbers of clock cycles is zero clock cycles; and the original time-of-flight estimate $-1/4$ where the difference between the first and second numbers of clock cycles is negative one clock cycle.

5. The method of claim 1, further comprising the step of determining an amount of clock drift between the first and second devices over a plurality of ranging estimates.

6. The method of claim 1, further comprising the step of averaging estimate results over multiple estimates to reduce the effects of timing uncertainties due to the presence of finite clock resolution.

7. The method of claim 1, wherein if multiple signals are received for an estimate step, the first signal received for that estimate step is used to measure a time of arrival for that step.

8. The method of claim 1, wherein if multiple signals are received for an estimate step, a subset of one or more of the multiple signals received for that estimate step is used to measure the time of arrival for that step.

9. The method of claim 1, wherein if multiple signals are received for an estimate step, all of the signals received for that estimate step is used to measure the time of arrival for that step.

10. The method of claim 1, wherein if multiple signals are received for an estimate step, the signal having the greatest signal strength for that estimate step is used to measure the time of arrival for that step.

11. The method of claim 1, wherein a transmit time used in conducting a time-of-flight estimate is calibrated to compensate for a time delay between the generation of the signal in a transmitting device and the transmission time from the antenna of that device.

12. The method of claim 1, wherein a receive time used in conducting a time-of-flight estimate is calibrated to compensate for a time delay between the reception time of a signal at the antenna of a device and the time the signal is detected by the receiver.

13. The method of claim 1, further comprising the step of compensating for sampling frequency offset between the first and second devices by determining a bias based on differences between estimates obtained using clock offset and the first estimate.

14. The method of claim 1, further comprising the step of compensating for sampling frequency offset between the first and second devices by determining a bias based on the estimate of the clock frequency offset as $$\hat{t}_{OF} \cdot f_0 = \hat{t}_{OFc} \cdot f_0 - \frac{T_{process}}{2 f_0} \cdot \Delta \hat{f}$$

where $\hat{t}_{OFc}$ is an estimate of time-of-flight without clock frequency offset compensation, $\Delta \hat{f}$ is an estimate of clock frequency offset and $T_{process}$ is a processing time between the packet reception and transmission.

15. The method of claim 1, further comprising introducing a clock phase offset.

16. The method of claim 15, wherein the clock phase offset is introduced by at least one of hardware switching, control logic, clock edge selection, clock drift and other clock anomalies that produce a clock offset.

17. The method of claim 15, wherein the clock phase offset is introduced in the first device to offset relative to the clock phase used to measure the first number of clock cycles.

18. The method of claim 1, further comprising repeating each of the steps of the claim to generate additional time-of-flight estimates and using a phase offset for each of the repeated set of steps.

19. The method of claim 1, wherein a transmit time used in conducting a time-of-flight estimate is calibrated to compensate for a time delay between the generation of the signal in a transmitting device and the transmission time from the antenna of that device and wherein a receive time used in conducting a time-of-flight estimate is calibrated to compensate for a time delay between the reception time of a signal at the antenna of a device and the time the signal is detected by the receiver.

20. The method of claim 1, wherein a time-of-flight is measured on a round trip basis and divided in half to estimate the one-way time-of-flight.

21. An electronic device configured to determine a distance between a first wireless device and a second wireless device, the electronic device comprising:
 a memory configured to store instructions; and
  a processor configured to read instructions from the memory, the instructions configured to cause the device to:
  the first device sending a first signal to the second device over a wireless communication channel;
  the first device receiving a second signal from the second device in response to the second signal;
  determining a first number of clock cycles elapsed between sending the first signal and receiving the second signal;
  the first device sending a third signal to the second device over a wireless communication channel;
  the first device receiving a fourth signal from the second device in response to the third signal;
  determining a second number clock cycles elapsed between sending the third signal and receiving the fourth signal; and
 determining a refined time-of-flight estimate between the first and second devices as a function of the first and second numbers of clock cycles.

22. The electronic device of claim 21, wherein the instructions are further configured to cause the device to determine a refined time-of-flight estimate as: a refined time-of-flight estimate between the first and second devices based on the difference between the first and second numbers of clock cycles.

23. The electronic device of claim 22, wherein the instructions are further configured to cause the device to compute the refined time of flight estimate as: the original time-of-flight estimate $c_1$ where the difference between the first and second numbers of clock cycles is one clock cycle; the original time-of-flight estimate $c_2$ where the difference between the first and second numbers of clock cycles is zero clock cycles; and the original time-of-flight estimate $c_3$ where the difference between the first and second numbers of clock cycles is negative one clock cycle, where $c_1$, $c_2$, and $c_3$, are constants.

24. The electronic device of claim 22, wherein the instructions are further configured to cause the device to determine the refined time of flight estimate as: the original time-of-flight estimate $-\frac{3}{4}$ where the difference between the first and second numbers of clock cycles is one clock cycle; the original time-of-flight estimate $-\frac{1}{2}$ where the difference between the first and second numbers of clock cycles is zero clock cycles; and the original time-of-flight estimate $-\frac{1}{4}$ where the difference between the first and second numbers of clock cycles is negative one clock cycle.

25. The electronic device of claim 21, wherein the instructions are further configured to cause the device to determining an amount of clock drift between the first and second devices over a plurality of ranging estimates.

26. The electronic device of claim 21, wherein the instructions are further configured to cause the device to averaging estimate results over multiple estimates to reduce the effects of timing uncertainties due to the presence of finite clock resolution.

27. The electronic device of claim 21, wherein the instructions are further configured to cause the device to use the first signal received to measure a time of arrival for that estimate step if multiple signals are received.

28. The electronic device of claim 21, wherein the instructions are further configured to cause the device to use a subset of one or more of the multiple signals received for that estimate step to measure the time of arrival for that step if multiple signals are received for an estimate step.

29. The electronic device of claim 21, wherein the instructions are further configured to cause the device to use all of the signals received for that estimate step to measure the time of arrival for that step if multiple signals are received for an estimate step.

30. The electronic device of claim 21, wherein the instructions are further configured to cause the device to use the signal having the greatest signal strength for that estimate step to measure the time of arrival for that step if multiple signals are received for an estimate step.

31. The electronic device of claim 21, wherein the instructions are further configured to cause the device to use a transmit time to conduct a time-of-flight estimate that is calibrated to compensate for a time delay between the generation of the signal in a transmitting device and the transmission time from the antenna of that device.

32. The electronic device of claim 21, wherein the instructions are further configured to cause the device to conduct a time-of-flight estimate by compensating for a time delay between the reception time of a signal at the antenna of a device and the time the signal.

33. The electronic device of claim 21, further comprising the step of compensating for sampling frequency offset between the first and second devices by determining a bias based on differences between estimates obtained using clock offset and the first estimate.

34. The electronic device of claim 21, wherein the instructions are further configured to cause the device to compensate for sampling frequency offset between the first and second devices by determining a bias based on the estimate of the clock frequency offset as $$\hat{t}_{OF} \cdot f_0 = \hat{t}_{OFc} \cdot f_0 - \frac{T_{process}}{2 f_0} \cdot \Delta \hat{f}$$

where $\hat{t}_{OFc}$ is an estimate of time-of-flight without clock frequency offset compensation, $\Delta \hat{f}$ is an estimate of clock frequency offset and $T_{process}$ is a processing time between the packet reception and transmission.

35. The electronic device of claim 21, further comprising instructions that cause the device to introducing a clock phase offset.

36. The electronic device of claim 35, further comprising instructions that cause the device to introduce clock phase offset by at least one of hardware switching, control logic, clock edge selection, clock drift and other clock anomalies that produce a clock offset.

37. The electronic device of claim 35, further comprising instructions that cause the device to introduce the clock phase offset in the first device to offset relative to the clock phase used to measure the first number of clock cycles.

38. The electronic device of claim 21, further comprising instructions that cause the device to repeat each of the steps of the claim to generate additional time-of-flight estimates using a phase offset for each of the repeated set of steps.

39. The electronic device of claim 21, further comprising instructions that cause the device to use a transmit time that is calibrated to compensate for a time delay between the generation of the signal in a transmitting device and transmission time from the antenna of that device to conduct a time-of-flight estimate and use a receive time that is calibrated to compensate for a time delay between the reception time of a signal at the antenna of a device and the time the signal is detected by the receiver to conduct a time-of-flight estimate.

40. The electronic device of claim 21, further comprising instructions that cause the device to measure a time-of-flight on a round trip basis and divided in half to estimate the one-way time-of-flight.

* * * * *